United States Patent
Hitchcock et al.

(10) Patent No.: US 10,354,075 B1
(45) Date of Patent: Jul. 16, 2019

(54) TRUSTWORTHY INDICATION OF SOFTWARE INTEGRITY

(71) Applicant: Amazon Technologies, Inc., Seattle, WA (US)

(72) Inventors: Daniel Wade Hitchcock, Bothell, WA (US); Darren Ernest Canavor, Redmond, WA (US); Jesper Mikael Johansson, Redmond, WA (US); Bharath Kumar Bhimanaik, Bangalore (IN); Andrew Jay Roths, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/638,867

(22) Filed: Jun. 30, 2017

Related U.S. Application Data

(63) Continuation of application No. 14/810,275, filed on Jul. 27, 2015, now Pat. No. 9,727,737.

(51) Int. Cl.
*G06F 21/00* (2013.01)
*G06F 21/57* (2013.01)
*G06F 3/0484* (2013.01)

(52) U.S. Cl.
CPC ........ *G06F 21/577* (2013.01); *G06F 3/04842* (2013.01); *G06F 2221/033* (2013.01)

(58) Field of Classification Search
CPC ............. G06F 21/577; G06F 2221/033; G06F 3/04842; G06F 8/60; H04L 9/321;
(Continued)

(56) References Cited

U.S. PATENT DOCUMENTS

| 7,506,799 B2* | 3/2009 | O'Donoghue | H04M 1/66 235/375 |
| 7,516,477 B2* | 4/2009 | Corby | G06F 21/51 726/1 |

(Continued)

OTHER PUBLICATIONS

"Payment Card Industry Data Security Standards Application Development and Maintenance Procedures," DoIT—Nov. 3, 2015—v.4, NH Department of Information Technology—Office of the Chief Information Officer (CIO) Effective—Jan. 3, 2012; 5 pages. (Year: 2012).*

(Continued)

*Primary Examiner* — Don G Zhao
(74) *Attorney, Agent, or Firm* — Lee & Hayes, P.C.

(57) ABSTRACT

Computing devices are disclosed that include functionality for providing a trustworthy indication of software integrity. The computing devices include a hardware trust evaluation device capable of determining the trustworthiness of computer programs executing on the devices. At least one trust indicator is also connected to the hardware trust evaluation device for providing an external indication of the trustworthiness of a computer program. Additional security information regarding the trustworthiness of the computer program may be displayed on the primary display device of the computing device. The display of the security information is triggered by a user of the computing device submitting a request through a secure mechanism, where the request is unobservable and inaccessible to programs executing on the computing device. Additional secure mechanisms, such as a unique user interface for displaying the security information, can be utilized to ensure the authenticity of the displayed security information.

20 Claims, 13 Drawing Sheets

(58) Field of Classification Search
CPC ... H04L 9/3247; H04L 9/3263; H04L 63/126; H04L 2209/80; H04W 12/10
See application file for complete search history.

(56) References Cited

U.S. PATENT DOCUMENTS

| | | | |
|---|---|---|---|
| 8,346,287 B2* | 1/2013 | King | H04L 63/062 380/249 |
| 8,572,403 B2 | 10/2013 | Beaumont et al. | |
| 9,430,640 B2* | 8/2016 | Li | H04L 63/12 |
| 9,444,630 B2* | 9/2016 | Sauve | H04L 63/126 |
| 9,444,823 B2* | 9/2016 | Narayanan | H04L 67/14 |
| 9,727,737 B1* | 8/2017 | Hitchcock | G06F 21/577 |
| 9,838,380 B2* | 12/2017 | Sauve | H04L 63/126 |
| 2004/0153644 A1 | 8/2004 | McCorkendale et al. | |
| 2005/0022034 A1 | 1/2005 | Chaudhari et al. | |
| 2005/0166064 A1 | 7/2005 | Dive-Reclus et al. | |
| 2006/0026676 A1* | 2/2006 | O'Donoghue | H04M 1/66 726/22 |
| 2006/0090192 A1 | 4/2006 | Corby et al. | |
| 2006/0100010 A1 | 5/2006 | Gatto et al. | |
| 2006/0218403 A1* | 9/2006 | Sauve | H04L 63/126 713/175 |
| 2006/0236122 A1 | 10/2006 | Field et al. | |
| 2007/0209060 A1* | 9/2007 | Rhodes | G06F 21/31 726/3 |
| 2008/0052698 A1 | 2/2008 | Olson et al. | |
| 2008/0077801 A1 | 3/2008 | Ekberg | |
| 2008/0104669 A1 | 5/2008 | Niemiec et al. | |
| 2008/0165971 A1 | 7/2008 | de Cesare et al. | |
| 2008/0209215 A1 | 8/2008 | Gao et al. | |
| 2009/0210702 A1* | 8/2009 | Welingkar | H04L 9/321 713/156 |
| 2010/0030805 A1* | 2/2010 | Hinton | G06F 21/41 713/157 |
| 2010/0235912 A1 | 9/2010 | Hermann et al. | |
| 2011/0010701 A1 | 1/2011 | Cooper et al. | |
| 2012/0192275 A1 | 7/2012 | Oliver et al. | |
| 2012/0222118 A1* | 8/2012 | Sauve | G06F 21/52 726/23 |
| 2012/0260345 A1 | 10/2012 | Quinn et al. | |
| 2013/0055387 A1* | 2/2013 | Kim | G06F 21/55 726/22 |
| 2013/0332740 A1* | 12/2013 | Sauve | H04L 63/126 713/175 |
| 2014/0096241 A1* | 4/2014 | Li | H04L 63/12 726/22 |
| 2014/0173738 A1 | 6/2014 | Condry et al. | |
| 2014/0344936 A1 | 11/2014 | Thario | |
| 2015/0074764 A1 | 3/2015 | Stern | |
| 2015/0113654 A1 | 4/2015 | Lymer et al. | |
| 2015/0234757 A1* | 8/2015 | You | G06F 21/604 710/267 |
| 2015/0358356 A1 | 12/2015 | Diaz-Tellez et al. | |
| 2016/0080379 A1* | 3/2016 | Saboori | H04L 63/0876 726/5 |
| 2016/0156593 A1* | 6/2016 | Yan | H04L 9/3228 726/4 |
| 2016/0261609 A1 | 9/2016 | Derman et al. | |
| 2017/0026363 A1* | 1/2017 | Sauve | H04L 63/126 |

OTHER PUBLICATIONS

Office action for U.S. Appl. No. 14/810,275, dated Nov. 16, 2016, Hitchcock et al., "Trustworthy Indication of Software Integrity", 24 pages.

Office action for U.S. Appl. No. 13/546,626, dated Feb. 25, 2016, Hitchcock et al., "Trustworthy Indication of Software Integrity", 31 pages.

Office Action for U.S. Appl. No. 13/546,626, dated Mar. 10, 2014, Hitchcock et al., "Trustworthy Indication of Software Integrity", 35 pages.

Final Office Action for U.S. Appl. No. 13/546,626, dated Apr. 9, 2015, Daniel W. Hitchcock, "Trustworthy Indication of Software Integrity", 28 pages.

Office Action for U.S. Appl. No. 13/546,626, dated Aug. 20, 2015, Daniel W. Hitchcock, "Trustworthy Indication of Software Integrity", 24 pages.

Office Action for U.S. Appl. No. 13/546,626, dated Sep. 22, 2014, Hitchcock et al., "Trustworthy Indication of Software Integrity", 21 pages.

Office Action for U.S. Appl. No. 13/546,626, dated Sep. 9, 2013, Hitchcock et al., "Trustworthy Indication of Software Integrity", 28 pages.

Wikipedia article entitled "Trusted Platform Module", 6 pps. [online][retrieved on Jul. 11, 2012] retrieved from http://en.wikipedia.org/wiki/Trusted_Platform_Module.

* cited by examiner

TRUSTWORTHY INDICATION OF SOFTWARE INTEGRITY

CROSS REFERENCE TO RELATED APPLICATIONS

This application is a continuation of co-pending U.S. patent application Ser. No. 14/810,275 filed Jul. 27, 2015 entitled "Trustworthy Indication of Software Integrity," which is incorporated by reference in its entirety herein.

BACKGROUND

A variety of technical mechanisms exist today for measuring and validating the source and integrity of program code executing on a computing device. Conveying the results of this type of validation is typically dependent upon displaying an on-screen message to a user of the computing device in a conventional fashion.

Traditional ways of conveying validation results on-screen can, however, be problematic in that user interface elements indicating that program code has been verified and is trustworthy might be imitated and rendered by malicious program code executing on the computing device. As a consequence, users might unknowingly permit the execution of compromised program code.

It is with respect to these and other considerations that the disclosure made herein is presented.

DETAILED DESCRIPTION

Figure 1:
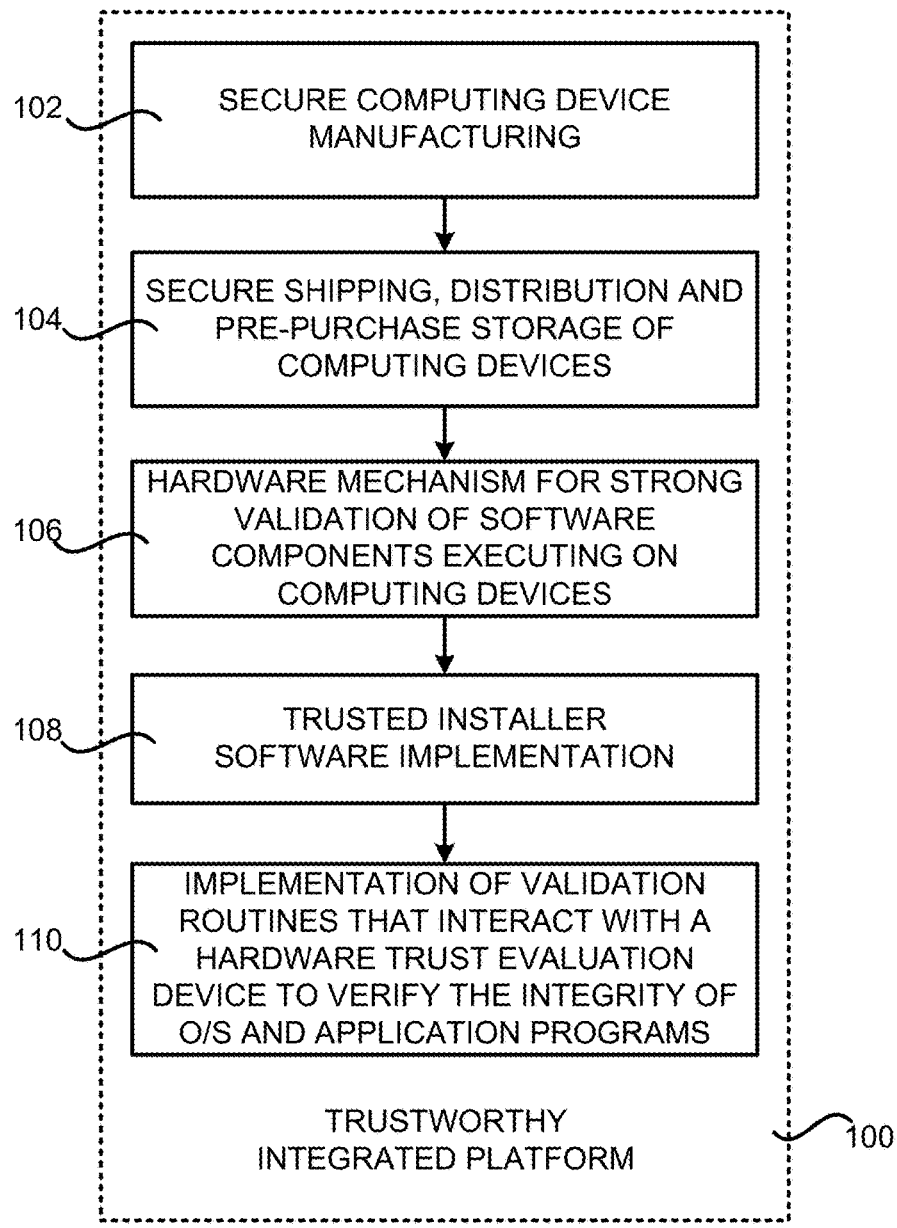
FIG. 1 is a block diagram showing aspects of a trustworthy integrated platform that provides one operating environment for the various embodiments disclosed herein.

The following detailed description is directed to technologies for providing a trustworthy indication of software integrity and/or additional security information for a software program. Through an implementation of the concepts and technologies disclosed herein, an indication of the integrity and/or additional security information for software executing on a computing device can be provided to a user of the computing device in a manner that is highly resilient to imitation attacks. Because the mechanisms described herein are more resilient to imitation attacks than traditional on-screen indications, the indications provided utilizing the disclosed mechanisms may be more trustworthy than traditional on-screen indications regarding the integrity of executing software.

According to one embodiment disclosed herein, a computing device is configured with a hardware trust evaluation device, such as a Trusted Platform Module ("TPM"). The hardware trust evaluation device is a hardware device that includes functionality for validating the integrity of program code executing on the computing device, such as an operating system, application programs, and device drivers. The integrity of a program may be validated, for instance, by determining that the program is unmodified from the version created by its developer. The integrity of a program might also be determined by verifying that a program was authored by a trusted developer. In this instance, a computer program might contain a mechanism to identify its author. Other mechanisms might also be utilized to verify the integrity of a program.

A user, administrator, or other entity can also be permitted to define what it means for a program to be trustworthy. For example, a user might define a program to be trustworthy if the program is invoked in a secure location, such as a folder that can only be modified by a trusted entity. The trustworthiness can also be defined based on the reputation of the program. If an application program that has been previously evaluated as trustworthy has not caused any negative impact on the computer, the program could be defined as trustworthy if the code of the program has not changed since the previous evaluation of trustworthiness.

The definition of trustworthiness might be described as a set of attributes related to the program with corresponding values. The attributes and the corresponding values might be stored in a secure place, such as within a memory inside the hardware trust evaluation device. The definition might also be periodically changed and/or updated. A computer program that has had its integrity verified and/or that satisfies the definition of trustworthiness is referred to herein as a "trustworthy" program. The hardware trust evaluation device might utilize various mechanisms to determine whether a computer program is trustworthy.

The computing devices disclosed herein can be configured with a trust indicator that is integrated with or connected directly to the hardware trust evaluation device. In one embodiment, for instance, the trust indicator is a light such as a light-emitting diode ("LED"), which is soldered directly to the hardware trust evaluation device and visible on an exterior surface of a case of the computing device. In other embodiments, the trust indicator is a display, speaker, buzzer, or other type of device through which a user-consumable signal indicating the trustworthiness of a computer program can be provided to a user of the computing device. The trust indicator is configured in a manner likely to minimize the possibility that indications provided by the trust indicator can be imitated by malicious program code executing on the computing device. The trust indicator is physically separated from the main display of the device, if the device has such a display. The trust indicator may also be configured with an input mechanism through which the user can make a choice regarding whether to permit execution of some piece of software, or it may utilize existing input mechanisms on the device but provide the user with assurance that the user's intended input reached the hardware trust evaluation device.

The computing devices disclosed herein might also be configured to cause the hardware trust evaluation device to evaluate the trustworthiness of a computer program executing on the computing device. For example, the hardware trust evaluation device may evaluate the trustworthiness of an application program when the application program is executed in the foreground on the computing device. In other embodiments, the hardware trust evaluation device may evaluate the trustworthiness of a driver program, such as a device driver for supporting the operation of a peripheral when the peripheral is connected to the computing device. The computing device might also be configured to cause the hardware trust evaluation device to evaluate the trustworthiness of other types of computer programs at other times.

If the hardware trust evaluation device determines that a computer program is trustworthy, the hardware trust evaluation device causes the trust indicator to provide a positive indication of the trustworthiness of the computer program. For example, in an embodiment where the trust indicator is an LED capable of illuminating in multiple colors, the hardware trust evaluation device might cause the LED to illuminate in green to provide a user of the computing device an indication that the computer program is trustworthy. Other types of positive indications of the trustworthiness of a computer program might also be provided.

If the hardware trust evaluation device determines that a computer program is not trustworthy, the hardware trust evaluation device causes the trust indicator to provide a negative indication of the trustworthiness of the computer program. For instance, in an embodiment where the trust indicator is an LED capable of illuminating in multiple colors, the hardware trust evaluation device might cause the LED to illuminate in red to provide a user of the computing device an indication that the computer program is not trustworthy. Other types of negative indications of the trustworthiness of a computer program might also be provided.

If the trust indicator is not capable of telling the user which specific computer program it is indicating it can rely on a primary display of the computing device to do so. The hardware trust evaluation device may have its own program on the computing device, which shows, in the foreground in a secure execution mode, a list of programs currently executing, allowing the user to choose one of them, in response to which choice the trust indicator indicates the trustworthiness of this program. The trust indicator may have a special indication mode when the hardware trust evaluation device program is executing. In an embodiment where the trust indicator is an LED, the hardware trust evaluation device might cause the LED to blink in a predefined sequence to indicate that the hardware trust evaluation device's special program should now be executing in the foreground. In another embodiment, the trust indicator might be utilized to provide an indication of the source of an executing program.

According to other embodiments, the computing device is also configured to restrict functionality of a computer program and/or the computing device in response to determining that a computer program on the device is not trustworthy. For example, the computing device might permanently or temporarily disable or restrict access to hardware components of the computing device, restrict access to application programming interfaces ("APIs"), remove data from the computing device, terminate the execution of the computer program, or entirely disable the computing device in response to determining that a computer program executing on the device is not trustworthy. Other types of functionality might also be restricted in response to identifying a computer program that is not trustworthy. In addition, the computing device might also send a notification to an administrator of the computing device to inform the administrator that the computing device has an untrustworthy computer program executing thereupon so that proper actions can be taken to minimize or eliminate any negative impact of the untrustworthy computer program on the computing device.

In other embodiments, the computing device is also configured to enable additional functionality in response to determining that a computer program on the device is trustworthy. For example, the computing device might take certain actions, such as providing a password or other type of credentials on behalf of the user, if an application program is deemed to be trustworthy. Other types of actions might also be performed in response to determining that a computer program executing on the computing device is trustworthy.

According to further aspects, details regarding the validation of the program, which might be referred to herein as "security information," can be displayed on a display of the computing device, such as the primary display of the computing device. The security information for a software program might include, but is not limited to, an indication of trustworthiness of the program, the name of the publisher or developer of the program, a certifying authority, a distinguished name, thumbprint or other technical signature details, and/or other information related to the security of the software program.

To ensure the integrity of the displayed security information, a secure mechanism is employed to trigger the display of the security information. In some implementations, for example, the display of the security information may be initiated by a user of the computing device pushing a button on the computing device. The button might be a special button that is dedicated to initiating the display of the security information of the program. The button might also be an existing button on the computing device that has been repurposed to allow the user to request the display of the security information of the program. In other implementations, the display of the security information may be triggered by the user of the computing device drawing a special pattern, or gesture, on a touchscreen of the computing device. Various other mechanisms can also be employed to trigger the display of the security information of an application program. In any event, the security information should not be displayed on the computing device without a user's explicit request using one of the triggering mechanisms.

It should be appreciated that the embodiments disclosed herein might be utilized with any type of computer, computing system, computing device, application program, operating system, or other type of system or component. Accordingly, although the embodiments disclosed herein are primarily presented in the context of a computing device that embodies the concepts disclosed herein for providing a trustworthy indication of software integrity, the disclosure presented herein is not limited to such an implementation.

It should also be appreciated that aspects of the subject matter presented herein may be implemented as a computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, tablet computers, electronic book readers, wireless telephone devices, smartphones, e-readers, special-purposed hardware devices, network appliances, or the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 and the following description are intended to provide a brief, general description of a suitable computing environment in which the embodiments described herein may be implemented. In particular, FIG. 1 is a block diagram showing aspects of a trustworthy integrated platform 100 that provides one operating environment for the various embodiments disclosed herein. The environment shown in FIG. 1 is, however, merely illustrative and the embodiments disclosed herein might be utilized in many other types of environments.

In order to provide the trustworthy indications of software integrity described herein, it is desirable, but not necessary, that a computing device that provides the indications be manufactured and operate within a trustworthy platform stack. For example, it is desirable that the computing device and its constituent hardware, firmware, operating system, and other components are also trustworthy. FIG. 1 provides a simplified description of such a platform stack, the trustworthy integrated platform 100.

As shown in FIG. 1, the platform 100 includes secure processes 102 for the manufacturing of the computing devices described herein. For instance, the processes 102 might include adherence to stringent manufacturing standards, as audited and certified by impartial third parties. The processes 102 are designed to implement safeguards for minimizing the risk of inclusion of compromised components in the computing devices disclosed herein.

The platform 100 also includes processes 104 and procedures for the secure shipping, distribution, and pre-purchase storage of computing devices that provide some or all of the functionality disclosed herein. These processes 104 are designed to minimize the risk of subsequent malicious manipulation of devices between the manufacturer and the recipient or consumer of the computing device.

Figure 2:
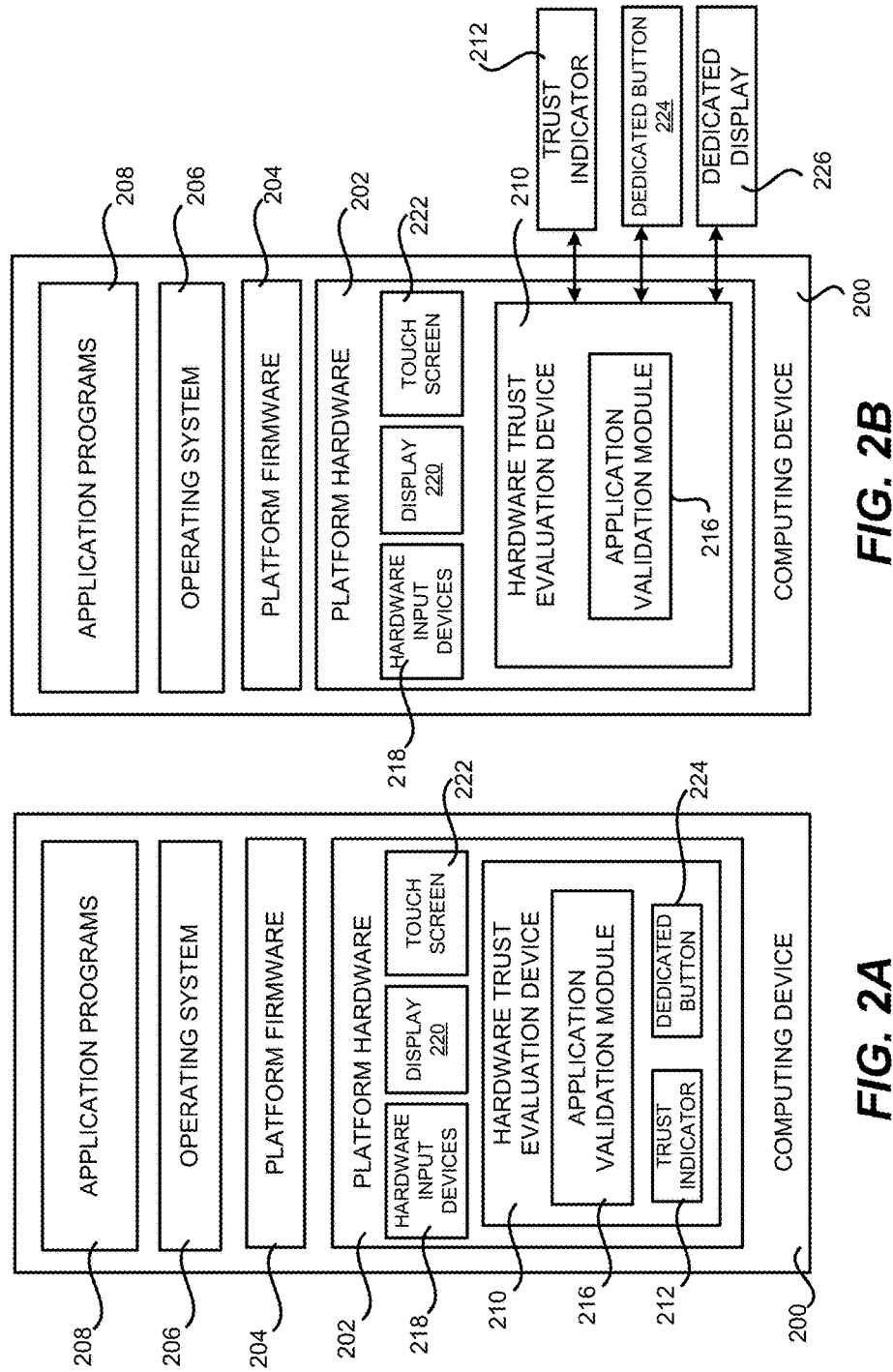
FIGS. 2A-2B are computer architecture diagrams showing several configurations of a computing device that embodies various aspects disclosed herein for providing trustworthy indication of software integrity.

The platform 100 also specifies the inclusion of hardware 106 designed to provide tamper-resistant storage and execution based upon security-sensitive material (e.g. private keys, signatures, etc.). This hardware 106 allows for strong validation of the trustworthiness of software components executing on the hardware of the device. Additional description regarding several examples of such hardware will be provided below with regard to FIGS. 2 and 3.

In one embodiment, the platform 100 also includes a trusted installer software implementation 108. The trusted installer software implementation 108 is coupled with other components within the platform 100 and allows for software updates, patches, and application installation to be performed without destroying the established chain of trust provided by the other components in the platform 100. The trusted installer software implementation 108 might also be integrated with an application store or other type of application delivery mechanism provided as a part of the platform 100.

As illustrated in FIG. 1, the platform 100 might also include validation routines 110. The implementation of validation routines 100 and corresponding processes by platform/operating system manufacturers enable interaction with a trusted hardware stack to also guarantee the integrity of the operating system executing on the computing devices disclosed herein.

One example of the platform 100 shown in FIG. 1 is a computer manufacturer that manufacturers and ships laptop computers using certified manufacturers and shippers. The laptop computers include functionality for encryption of mass storage devices and secure startup. The laptop computers might also include a TPM for evaluating the integrity of the operating system and application programs that execute on the laptop. In another example, a manufacturer provides smartphones or e-reader devices that are manufactured, delivered, and configured in a similar fashion. Other types of computing devices might also be provided in a similar fashion.

The platform 100 described in FIG. 1 offers useful security guarantees to an end user of a computing device. These guarantees, however, are very abstract in the sense that there is typically no direct indication to the user of these attributes. More specifically, when a user attempts to execute a computer program on a computing device, there is often no way for the user to make a reasonable determination regarding the trustworthiness of the computer program. Even in cases where some attempt is made to assert the safety of an operation or program, these attempts are inevitably rendered on a display screen that is subject to potential subversion by malicious parties. As a result, it is difficult for users to safely trust such assertions. To avoid this, the assertion may be presented by way of a trust indicator that is integrated with or otherwise connected directly to the hardware trust evaluation module. The assertion might also be presented on a display screen in a manner that eliminates the possibility of subversion in some configurations.

It should be appreciated that the operating environment shown in FIG. 1 is merely illustrative and that many other types of operating environments might be utilized. In particular, the concepts and technologies disclosed herein for providing a trustworthy indication of software integrity might operate as a part of the platform 100. The components of the platform 100 are not, however, required for every implementation of the various aspects disclosed herein. In this regard the environment shown in FIG. 1 should not be considered as limiting the scope of the inventive concepts disclosed herein in any way.

FIGS. 2A-2B are computer architecture diagrams showing several configurations of a computing device 200 that embodies various aspects disclosed herein for providing trustworthy indication of software integrity. The computing device 200 may be a personal computer ("PC"), desktop workstation, laptop computer, tablet computer, notebook computer, personal digital assistant ("PDA"), smartphone, feature phone, electronic-book reader, game console, set-top box, consumer electronics device, server computer, a wearable computing device (such as a smart watch, a smart glass, a virtual reality head-mounted display), or any other type of computing device.

As shown in FIG. 2A, the computing device 200 includes platform hardware 202. As will be described in greater detail below, the platform hardware 202 may include one or more central processing units ("CPUs"), volatile and non-volatile memory devices. The platform hardware 202 may also include an integrated display screen 220, a touch screen 222 and hardware input devices 218. The hardware input devices 218 might include hardware buttons for activating various functions of the computing device 200, such as a hardware button for turning on/off the computing device 200, a hardware button for tuning up the volume of a speaker of the computing device 200, a hardware button for tuning down the volume of the speaker, a hardware button for activating a camera integrated with the computing device 200 and so on. The hardware input devices might also include touch input buttons including conductive, inductive or resistive buttons, such as a search button for bringing up a search user interface, a menu button for displaying a user menu, a back button for returning the display screen to a previous user interface and the like.

In some implementations, the hardware input devices 218 might also include a hardware button dedicated to initiate the evaluation of the trustworthiness and the display of the security information for a computer program that is executing on the computing device 200 and is presenting a user interface on the display screen 220 of the computing device 200. In other implementations, existing hardware buttons, such as the buttons for tuning the speaker volume and the button for activating the camera, might be repurposed to allow a user to initiate the display of the security information by special operations such as a "triple click" on a button or simultaneous pressing two or more buttons. Similarly, the display of the security information may also be initiated via a dedicated touch input button or one or more repurposed existing touch input buttons. In further implementations, the touch screen 222 may also be utilized to initiate the display of the security information of an application program through a user drawing a special pattern, or gesture, on the touch screen 222, for example.

The platform hardware 202 might also include various other types of devices depending upon the particular configuration. For instance, a smartphone might also include a wireless cellular radio, a global positioning system ("GPS") sensor, a gyroscope, and other types of sensors. A laptop computer might include a touch screen, a physical keyboard, a track pad, network interface devices, and other types of hardware. Other types of computing devices may include other types of platform hardware 202.

A platform firmware 204 executes on the platform hardware 202 in various embodiments disclosed herein. The firmware 204 typically provides functionality for booting the computing device 200. The firmware 204 might also include functionality for providing an interface to the platform hardware 202 to an operation system 206 or application programs 208. The firmware 204 might also provide other types of functionality. Examples of the firmware 204 include, but are not limited to, a PC-compatible basic input/output system ("BIOS") and a firmware compatible with the Unified Extensible Firmware Interface ("UEFI") specification. Other types of firmware 204 might also be utilized.

An operating system 206 executes on top of the firmware 204 that is utilized to control the operation of the computing device 200. According to one embodiment, the operating system comprises the ANDROID operating system from GOOGLE INC. According to another embodiment, the operating system comprises the iOS operating system from APPLE INC. According to further embodiments, the operating system may comprise the LINUX, UNIX, SOLARIS, OS X, or WINDOWS operating systems, from their respective manufacturers. It should be appreciated that another type of operating system 206 might also be utilized.

One or more application programs 208 might also execute on the operating system 206. Applications might execute in the foreground or in the background. An application executing in the foreground typically has its user interface actively presented to a user of the computing device 200. The user interface of an application program 208 executing in the background may not be visible to a user of the computer device 200 or might be inactive.

It should be appreciated that other types of computer programs in addition to the operating system 206 and the application programs 208 might be executed on the computing device 200. For instance, driver programs and other types of low-level software might also be executed on the computing device. In one specific example, a peripheral connected to the computing device 202 might utilize a device driver to support its functionality. Other types of computer programs might also be executed. Additionally, the computing device 200 and the computer programs that execute thereupon might also be designed, manufactured, delivered, and operated utilizing the trustworthy integrated platform 100 described above with regard to FIG. 1.

The computing device 200 might also be equipped with a hardware trust evaluation device 210. The hardware trust evaluation device 210 is a hardware component that is capable of determining the integrity, or trustworthiness, of a computer program executing on the computing device 200. For example, when a user of the computing device 200 requests to launch an application program 208, the operating system 206 might request that the hardware trust evaluation device 210 determine the trustworthiness of the launched application program 208. In response thereto, the hardware trust evaluation device 210 determines the trustworthiness of the application program 208. This determination may be made, at least in part, on material held within a secure location. For example, the hardware trust evaluation device 210 might maintain the public portion of a key associated with a certificate for the signing of application programs. Other mechanisms might also be utilized.

In one implementation the hardware trust evaluation device 210 is a Trusted Platform Module ("TPM") constructed in accordance with the TPM Specification from the Trusted Computing Group. A TPM offers facilities for the secure generation of cryptographic keys, and limitation of their use, in addition to a hardware true random number generator. It also includes capabilities such as remote attestation, binding, and sealed storage. Remote attestation creates a nearly unforgeable hash-key summary of a hardware and software configuration. The program encrypting the data determines the extent of the summary of the software. This allows a third party to verify that the software has not been changed. Binding encrypts data using a TPM endorsement key, a unique RSA key burned into the TPM during its production, or another trusted key descended from it. Sealing encrypts data in similar manner to binding, but in addition specifies a state in which the TPM must be in order for the data to be decrypted (unsealed). The TPM can be used to authenticate hardware devices and to verify the integrity of software. Since each TPM includes a unique and secret RSA key, each TPM is capable of determining the trustworthiness of platform hardware and software executing on the platform. Additional details regarding the structure and operation of a TPM will be provided below with regard to FIG. 3. It should be appreciated that while a TPM is utilized in embodiments as the hardware trust evaluation device 210, other types of hardware devices might also be utilized to evaluate the integrity of a computer program and to present the indicators disclosed herein.

According to embodiments disclosed herein, the hardware trust evaluation device 210 has a trust indicator 212 connected thereto. As mentioned briefly above, the trust indicator 212 is integrated with or connected directly to the hardware trust evaluation device 210. In one embodiment, for instance, the trust indicator 212 is a light, such as an LED, which is soldered directly to the hardware trust evaluation device 210 and visible on an exterior surface of a case of the computing device 200. In other embodiments, the trust indicator 212 is a display, speaker, buzzer, scent generator, or other type of device through which a signal indicating the trustworthiness of a computer program can be provided to a user of the computing device 200. The trust indicator 212 is configured in a manner likely to minimize the possibility that indications provided by the trust indicator 212 can be imitated by malicious program code executing on the computing device 200.

As shown in FIG. 2A, the trust indicator 212 is integrated with the hardware trust evaluation device 210 in one embodiment. For example, the trust indicator 212 might be soldered directly to a circuit board containing the hardware trust evaluation device 210. In another embodiment, shown in FIG. 2B, the trust indicator 212 is connected directly to the hardware trust evaluation device 210, but is not integrated directly with the hardware trust evaluation device 210. For instance, in this embodiment the trust indicator 212 might be connected to the hardware trust evaluation device 210 by one or more wires. Other types of connections might also be made between the hardware trust evaluation device 210 and the trust indicator 212.

Similarly, a dedicated button 224 for requesting display of the security information described above might also be integrated with the hardware trust evaluation device 210 or connected directly to the hardware trust evaluation device 210. In another implementation, the trust indicator 212 might also serve as the dedicated button 224 that a user can press down to request the display of the security information for the application program. Likewise, a dedicated display 226 may also be integrated or connected directly to the hardware trust evaluation device 210 for displaying the security information. By integrating or directly connecting the dedicated button 224 and the dedicated display 226 with the hardware trust evaluation device 210, the evaluation process and the displayed security information are less likely to be imitated and rendered by malicious program code executing on the computing device, thereby improving the security of the evaluation process.

As will be described in greater detail below, the computing device 200 is configured in various embodiments to cause the hardware trust evaluation device 210 to evaluate the trustworthiness of a computer program executing on the computing device 200. For example, the hardware trust evaluation device 210 might evaluate the trustworthiness of an application program 208 when the application program is executed in the foreground on the computing device 200. In other embodiments, the hardware trust evaluation device 210 may evaluate the trustworthiness of a device driver program for supporting the operation of a peripheral when the peripheral is connected to the computing device 200. The computing device 200 might also be configured to cause the hardware trust evaluation device 210 to evaluate the trustworthiness of other types of computer programs at other times.

If the hardware trust evaluation device 210 determines that a computer program is trustworthy, the hardware trust evaluation device 210 causes the trust indicator 212 to provide a positive indication of the trustworthiness of the computer program. For example, in an embodiment where the trust indicator 212 is an LED capable of illuminating in multiple colors, the hardware trust evaluation device 210 might cause the LED to illuminate in green to provide a user of the computing device 200 an indication that the computer program is trustworthy. Other types of positive indications of the trustworthiness of a computer program might also be provided.

If the hardware trust evaluation device 210 determines that a computer program is not trustworthy, the hardware trust evaluation device 210 causes the trust indicator 212 to provide a negative indication of the trustworthiness of the computer program. For instance, in an embodiment where the trust indicator 212 is an LED capable of illuminating in multiple colors, the hardware trust evaluation device 210 might cause the LED to illuminate in red to provide a user of the computing device 200 an indication that the computer program is not trustworthy. Other types of negative indications of the trustworthiness of a computer program might also be provided.

According to other embodiments, the computing device 200 is also configured to restrict functionality of a computer program and/or the computing device 200 in response to determining that a computer program on the device is not trustworthy. In this regard, the untrustworthy program may or may not be permitted to continue execution. If the program is permitted to continue execution, however, certain functionality of the program and/or the computing device may be restricted. For example, the computing device 200 might disable or restrict access to hardware components of the computing device 200, restrict access to APIs, remove data from the computing device 200, or entirely disable the computing device 200 in response to determining that a computer program executing on the device is not trustworthy. In other embodiments, the computing device 200 might restrict the dollar amount of transactions that can be performed using the computing device 200 if an untrustworthy program is identified as executing on the device. Other types of functionality might also be restricted in response to identifying a computer program that is not trustworthy.

In other embodiments, the computing device 200 is also configured to enable additional functionality in response to determining that a computer program executing on the device 200 is trustworthy. For example, the computing device 200 might take certain actions, such as providing a password or other type of credentials on behalf of a user, if an application program is deemed to be trustworthy. Other types of actions might also be performed in response to determining that a computer program executing on the computing device 200 is trustworthy.

According to further aspects, the hardware trust evaluation device 210 might also include an application validation module 216. The application validation module 216 might be configured to receive a request generated by a user of the computing device 200 through one of the secure mechanisms described above for displaying the security information of an application program, such as operating on a dedicated button or one or more buttons existing buttons, the touch screen 222, or the dedicated button 224 if it is integrated or connected directly to the hardware trust evaluation device 210. In response to receiving the request, the application validation module 216 might identify a computer program associated with the received request. In scenarios where the entirety of the display screen 220 is allocated to only one application program at a time, the application validation module 216 may determine that the request is for the current foreground application program. Additionally, and/or alternatively, application validation module 216 may, as described above, show a list of programs currently executing, allowing the user to choose one of them as the program associated with the request. In other scenarios where the available display area of the screen 220 is shared by multiple software programs, such as in pre-emptive multitasking environments such as the MICROSOFT WINDOWS operating system, the application program associated with the request might be identified as the current active window, or by the user performing explicit targeting, such as via a hotkey sequence followed by a mouse click, to select the application program to be evaluated.

Once the application validation module 216 identifies the computer program associated with the request for display of security information, the application validation module 216 may cause the hardware trust evaluation device 210 to evaluate the trustworthiness of the computer program as described above. Based on the evaluation results, the application validation module 216 might generate the security information for the application program, which might include, but is not limited to, an indication of trustworthiness of the program, the name of the developer or publisher of the program, the certifying authority associated with the program, the distinguished name, a thumbprint or other technical signature details, and/or other information related to the security of the application program. The application validation module 216 may then cause the generated security information to be displayed on the integrated display screen 220 or the dedicated display 226 if available.

It should be noted that while the application validation module 216 is described above as being included in the hardware trust evaluation device 210, it may also be included in the operating system 206 if the operating system 206 can be trusted. Additional details regarding these and other aspects of the computing device 200 disclosed herein will be provided below with regard to FIGS. 3-13.

Figure 3:
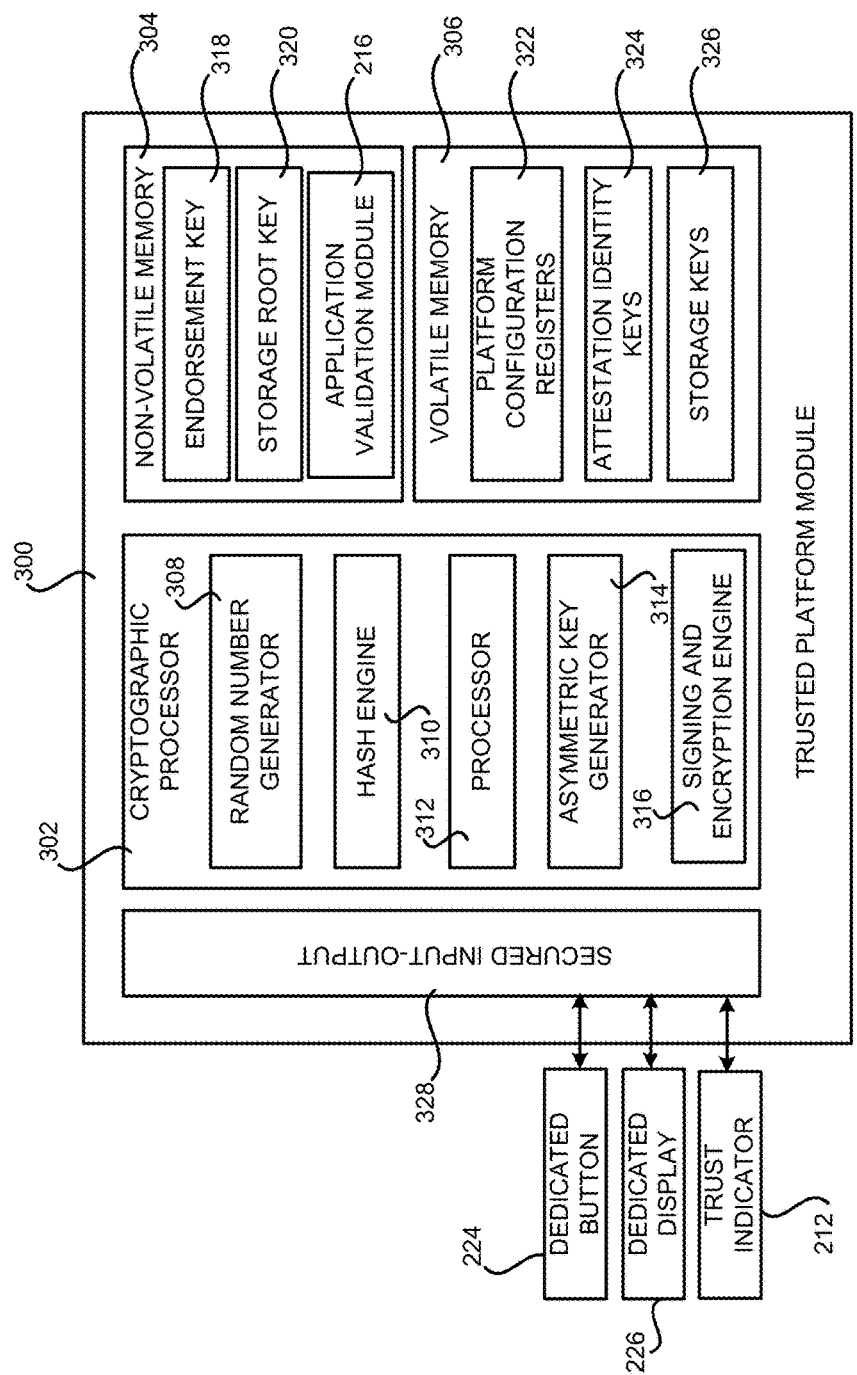
FIG. 3 is a computer architecture diagram showing the configuration of a Trusted Platform Module that may be utilized to implement various aspects disclosed herein for providing trustworthy indication of software integrity.
Figure 4:
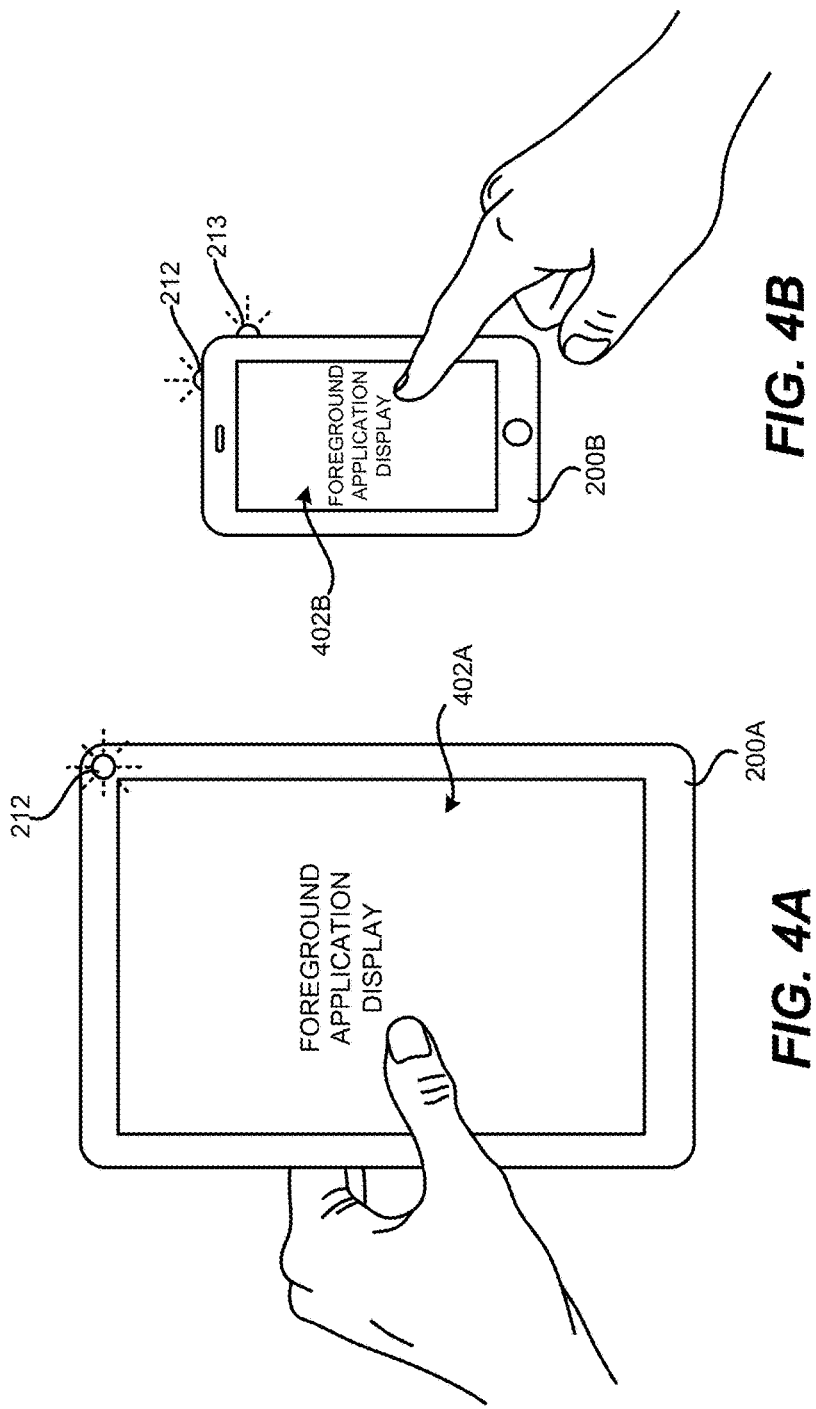
FIGS. 4A-4B are device diagrams showing aspects of the utilization of a tablet device and a smartphone device, respectively, that implement at least some of the functionality disclosed herein for providing trustworthy indication of software integrity.

As mentioned above with regard to FIGS. 2A-2B, the hardware trust evaluation device 210 is a TPM in one implementation. FIG. 3 is a computer architecture diagram showing the configuration of a TPM 300 that may be utilized to implement various aspects disclosed herein for providing trustworthy indication of software integrity. As shown in FIG. 3, the TPM 300 includes a cryptographic processor 302, a non-volatile memory 304, and a volatile memory 306. The cryptographic processor 302 includes a random number generator 308, a hash engine 310, a processor 312, an asymmetric key generator 314, and a signing and encryption engine 316. The non-volatile memory 304 stores an endorsement key 318 and a storage root key 320. According to implementations disclosed herein, the non-volatile memory 304 may also store the application validation module 216 described above. The volatile memory 306 stores platform configuration registers 322, attestation identity keys 324, and storage keys 326. In this regard, it should be appreciated that the TPM 300 may be configured to perform many more functions than those described herein for providing a trustworthy indication of software integrity.

In one implementation, the TPM 300 also includes a secured input-output module 328. The secured input-output module 328 might include appropriate circuitry for driving the trust indicator 212. For instance, the secured input-output module 328 might include appropriate circuitry for driving one or more single or multi-colored LEDs or other type of lights. Other types of circuitry might also be provided for driving other types of trust indicators 212, such as displays, buzzers, speakers, and others.

As also mentioned briefly above, the trust indicator 212 might be integrated directly into the TPM 300. For instance, the trust indicator 212 might be soldered directly to the TPM. In this embodiment, the TPM 300 might be installed in a case of a computing device 200 such that the trust indicator 212 can protrude through the case and be visible to a user of the device from the outside of the case. In other embodiments, a wire might be utilized to connect the trust indicator 212 to the TPM 300. In this embodiment, the trust indicator 212 might also be mounted in the case of the computing device 200 such that it protrudes through the case and is visible from the exterior of the computing device. Using a wire to connect the trust indicator 212 to the TPM 300 might provide flexibility in locating the TPM 300 within the case of the computing device 200. Other implementations might also be utilized. Regardless of the implementation utilized, no components in a computing device 200 other than the TPM 300 should have access to or be able to activate the trust indicator 212. Likewise, the secured input-output module 328 might also include appropriate circuitry for driving a dedicated button 224 and a dedicated display 226 as described above, which are only accessible to the TPM 300.

According to various embodiments, the cryptographic processor 302 is configured to determine the trustworthiness of computer programs executing on the computing device 200. This functionality might be performed in response to a request from the operating system 206, for instance, or in response to a request from another component, such as the application validation module 216. If the cryptographic processor 302 determines that a computer program is trustworthy, the cryptographic processor 302 causes the secured input-output module 328 to provide a positive indication of the trustworthiness of the computer program by way of the trust indicator 212. If the cryptographic processor 302 determines that a computer program is not trustworthy, the cryptographic processor 302 causes the secured input-output module 328 to provide a negative indication of the trustworthiness of the computer program by way of the trust indicator 212. Based on the evaluation results, the application validation module 216 might generate or obtain additional security information related to computer program and cause the security information to be displayed on the dedicated display 226 or the integrated display screen 220. Additional details regarding these processes will be provided below with regard to FIGS. 4A-13.

FIGS. 4A-4B are device diagrams showing aspects of the utilization of several computing devices 200 that implement at least some of the functionality disclosed herein for providing a trustworthy indication of software integrity. In particular, FIG. 4A shows a tablet computing device 200A that implements the functionality disclosed herein. As illustrated in FIG. 4A, the tablet computing device 200A includes a trust indicator 212 that is exposed on the user-facing surface of the tablet computing device 200A. Internally, the trust indicator 212 is connected to a hardware trust evaluation device 210 in the manner described above.

A user of the tablet computing device 200A may utilize various mechanisms to begin the execution of an application program on the tablet computing device 200A. When the application is started, it may be executed in the foreground and present a foreground application display 402A on a display screen of the table computing device 200A. Additionally, when the application program is executed and comes to the foreground, an operating system 206 executing on the tablet computing device 200A may request that the hardware trust evaluation device 210 evaluate the trustworthiness of the foreground application program. If the application program is found to be trustworthy, the hardware trust evaluation device 210 will provide a positive indication of the trustworthiness of the application program by way of the trust indicator 212. For instance, the hardware trust evaluation device 210 might cause the trust indicator 212 to be illuminated in the color green.

If the application program is found to not be trustworthy, the hardware trust evaluation device 210 will provide a negative indication of the trustworthiness of the application program by way of the trust indicator 212. For instance, the hardware trust evaluation device 210 might cause the trust indicator 212 to be illuminated in the color red. In this way, a user of the tablet computing device 200A can be provided an indication of the trustworthiness of the application program in a manner that is not likely to be spoofed by malicious code executing on the tablet computing device 200A. If a negative indication of trustworthiness is provided, the user of the device 200A would understand not to enter credit card information, password information, other private or sensitive information, or to take any other actions that might be utilized by a malicious computer program.

The various concepts and technologies disclosed herein might also be utilized with a smartphone computing device 200B, such as that shown in FIG. 4B. In the example shown in FIG. 4B, a trust indicator 212 has been located on a top surface of the smartphone computing device 200B. When an application is executed in the foreground on the smartphone computing device 200B, the application may present a foreground application display 402B. Additionally, the trustworthiness of the application may be determined in the manner described above. A positive or negative indication of the trustworthiness of the application may then be provided to a user of the smartphone computing device 200B by way of the trust indicator 212.

It should be appreciated that the trust indicator 212 might also be utilized to provide indications of the trustworthiness of other types of program code executing on a computing device 200. For instance, the trust indicator 212 might be utilized to indicate the integrity of the operating system 206 at a boot time of a computing device 200. The trust indicator 212 might also be utilized to indicate the integrity of device drivers for a peripheral device at the time the peripheral is connected to the computing device 200. The trust indicator 212 might also be utilized to provide an indication that the integrity of a program cannot be measured. For instance, the trust indicator 212 may be illuminated in yellow or flashed in a certain pattern if the trustworthiness of an application cannot be measured for some reason.

According to other embodiments, multiple trust indicators 212 might be utilized. For example, two or more indicators 202 might be utilized to present varying degrees of trust for a computer program. Additionally, the indications provided by the trust indicators 212 might be configured for use by persons with disabilities. For example, the trust indicators 212 might be configured to present indicators that can be easily distinguished by persons with color blindness. In a similar fashion, sounds, haptic feedback, or olfactory signals might be provided for people that are partially or completely blind. Other types of audible, visual, tactile, haptic, and olfactory feedback might be utilized for persons with other types of disabilities. In this regard, it should be appreciated that the indications might be conveyed by way of any of the human senses.

The trust indicator 212 might also be configured to provide other types of indications in other embodiments. For instance, the trust indicator 212 might be configured to protrude, vibrate, become warm to the touch, or provide another type of feedback when a program is determined to be trustworthy or untrustworthy. Unique vibration patterns or patterns of flashing lights may be employed to indicate trust or distrust of a computer program. Additionally, non-activity might be utilized to indicate trust or distrust. For instance, if a program is determined to be trustworthy, the trust indicator 212 might do nothing. If, however, a program is determined to not be trustworthy, the trust indicator 212 may be activated. Other implementations might also be utilized.

In the example shown in FIG. 4B, the smartphone computing device 200B is also configured with a secondary trust indicator 213. The secondary trust indicator 213 might be connected to the hardware trust evaluation device 210 and configured in a manner similar to the trust indicator 212 described above. The secondary trust indicator 213 might, however, be utilized to provide other types of indications of trustworthiness in addition to those provided by the trust indicator 212. For instance, where the trustworthiness of an executing application has been verified, the secondary trust indicator 213 might be utilized to provide an indication of the trust-worthiness of elements, activities, data, etc. occurring within the trusted application.

As one example, a trusted Web browser application executing on the device 200B might turn the secondary trust indicator 213 red if it suspects the current Web site to be malicious in some way. An e-mail client executing on the device 200B might similarly turn the secondary trust indicator 213 red, or show something else on a mini-display, etc., if an e-mail message is suspected to have malicious content or unsolicited bulk e-mail ("UBE" or "spam"). In another example, an e-mail client executing on the device 200B might turn the secondary trust indicator 213 orange if it receives a non-spam e-mail from a person not identified in a user's address book. In another example, a word processing program executing on the device 200B might turn the secondary trust indicator 213 green if a document being edited is from a "trusted sender." A trusted sender might be identified based upon a signature or other cryptographic/identity construct. It should be utilized that an application executing on the device 200B might utilize a secondary trust indicator 213 in ways other than those described above.

In some embodiments, the measurement of the integrity of a computer program occurs without user input. As briefly discussed above, and as will be explained in further detail below, in other implementations, however, a user might request that the trustworthiness of an application be evaluated. For example, the trust indicator 212 might include a light and a switch/button. In this example, a user of a computing device 200 might press down on the trust indicator 212 to activate the switch/button and request that the hardware trust evaluation device 210 evaluate the trustworthiness of the program executing in the foreground. Other types of mechanisms might also be utilized to request the evaluation of the integrity of programs executing in the background or programs that do not render any type of user interface.

It should be appreciated that while FIGS. 4A and 4B illustrate a tablet computing device 200A and a smartphone computing device 200B, respectively, the embodiments disclosed herein might be utilized with other types of computing devices. For instance, the embodiments disclosed herein might be utilized with PCs, desktop workstations, laptop computers, notebook computers, PDAs, feature phones, electronic-book ("e-book") readers, game consoles, set-top boxes, consumer electronics devices, server computers, wearable computing devices (such as smart watches, smart glasses, virtual reality head-mounted displays) and other types of computing devices. In implementations where a computing device utilizes an external display, it may be necessary to implement a protocol for trusted interaction between the measuring device and the display device upon which the trust indicator 212 is located.

Figure 5:
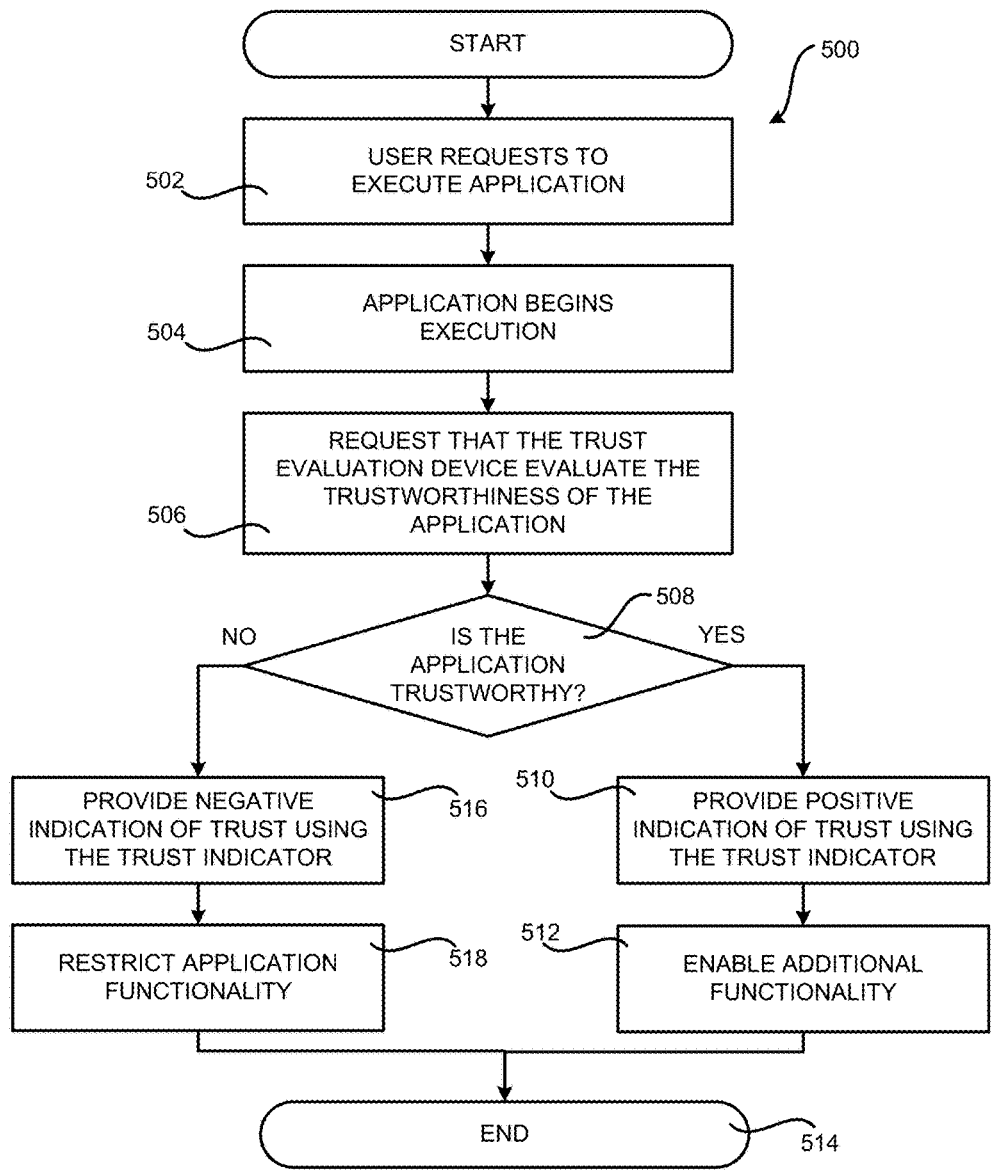
FIG. 5 is a flow diagram showing aspects of one illustrative routine for providing a trustworthy indication of the integrity of an application program, according to one embodiment disclosed herein.

Turning now to FIG. 5, additional details will be provided regarding the embodiments described herein for providing a trustworthy indication of software integrity. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein with reference to the various FIGURES are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 5 is a flow diagram showing aspects of one illustrative routine 500 for providing a trustworthy indication of the integrity of an application program 208, according to one embodiment disclosed herein. The routine 500 begins at operation 502, where a user requests to execute an application program 208 on a computing device 200. In response to receiving such a request, the routine 500 proceeds to operation 504, where the selected application program 208 begins executing in the foreground.

From operation 504, the routine 500 proceeds to operation 506, where the operating system 206 requests that the hardware trust evaluation device 210 evaluate the trustworthiness of the application program 208 executing in the foreground. In response thereto, the hardware trust evaluation device 210 evaluates the trustworthiness of the application program 208 in the manner described above.

If, at operation 508, the hardware trust evaluation device 210 determines that the application program 208 executing in the foreground is trustworthy, the routine 500 proceeds from operation 508 to operation 510. At operation 510, the hardware trust evaluation device 210 provides a positive indication of the trustworthiness of the application program 208 using the trust indicator 212. For example, the hardware trust evaluation device 210 might cause an LED trust indicator 212 to illuminate in the color green.

From operation 510, the routine 500 proceeds to operation 512, where additional functionality might be enabled in response to determining that the application program 208 executing in the foreground is trustworthy. For example, the computing device 200 might take certain actions on behalf of a user of the computing device 200, such as providing a password or other type of credentials without requiring user input, if an application program 200 is deemed to be trustworthy. Other types of actions might also be performed in response to determining that a computer program executing on the computing device 200 is trustworthy.

If, at operation 508, the hardware trust evaluation device 210 determines that the application program 208 executing in the foreground is not trustworthy, the routine 500 proceeds from operation 508 to operation 516. At operation 516, the hardware trust evaluation device 210 provides a negative indication of the trustworthiness of the application program 208 using the trust indicator 212. For example, the hardware trust evaluation device 210 might cause an LED trust indicator 212 to illuminate in the color green.

From operation 516, the routine 500 proceeds to operation 518, where the computing device 200 might also restrict functionality of the application program 208 and/or the computing device 200 in response to determining that the application program 208 is not trustworthy. For example, the computing device 200 might disable or restrict access to hardware components of the computing device 200, restrict access to APIs on the computing device 200, remove data from the computing device 200, terminate the execution of the application program 208, or entirely disable the computing device 200 in response to determining that the application program 208 is not trustworthy. Other types of functionality might also be restricted in response to identifying an application program 208 that is not trustworthy. In addition, the computing device 200 might also send a notification to an administrator of the computing device to inform the administrator that the computing device has an untrustworthy computer program executing thereon so that proper actions can be taken to minimize or eliminate any negative impact of executing the untrustworthy computer program on the computing device 200. From operations 512 and 518, the routine 500 proceeds to operation 514, where it ends.

It should be appreciated that, in various embodiments, one or more of operations 510, 512, 516, and 518 might be omitted. For instance, a negative indication of trust might be provided at operation 516, but operation 518 might be omitted. In a similar fashion, functionality might be restricted at operation 518 without providing a negative indication of trust at operation 516. As another example, a positive indication of trust might be provided at operation 510, but operation 512 might be omitted. Similarly, additional functionality might be provided at operation 512 without providing a positive indication of trust at operation 510.

According to further aspects, the hardware trust evaluation device 210 might constantly evaluate the trustworthiness of a computer program while it is executing on the computing device 200 and keep the trust indicator 212 illuminated to indicate the trustworthiness of the program so that the user of the computing device 200 may consult the trust indicator 212 at any time. For example, the hardware trust evaluation device 210 may perform the evaluation in every 10 seconds or other time period. Alternatively, the operating system or other components, such as the application validation module 216, may maintain a list of events that might cause problems or otherwise interfere with the proper operation of the computing device 200. For example, the list of events might include, but are not limited to, calling sensitive APIs, connecting to a new access point, connecting to a new peripheral device, and others. The evaluation/re-evaluation of the trustworthiness of the computer program is triggered by the occurrence of any of these events. Other mechanisms might also be utilized to facilitate the constant monitoring and indication of the trustworthiness of the computer program.

Figure 6:
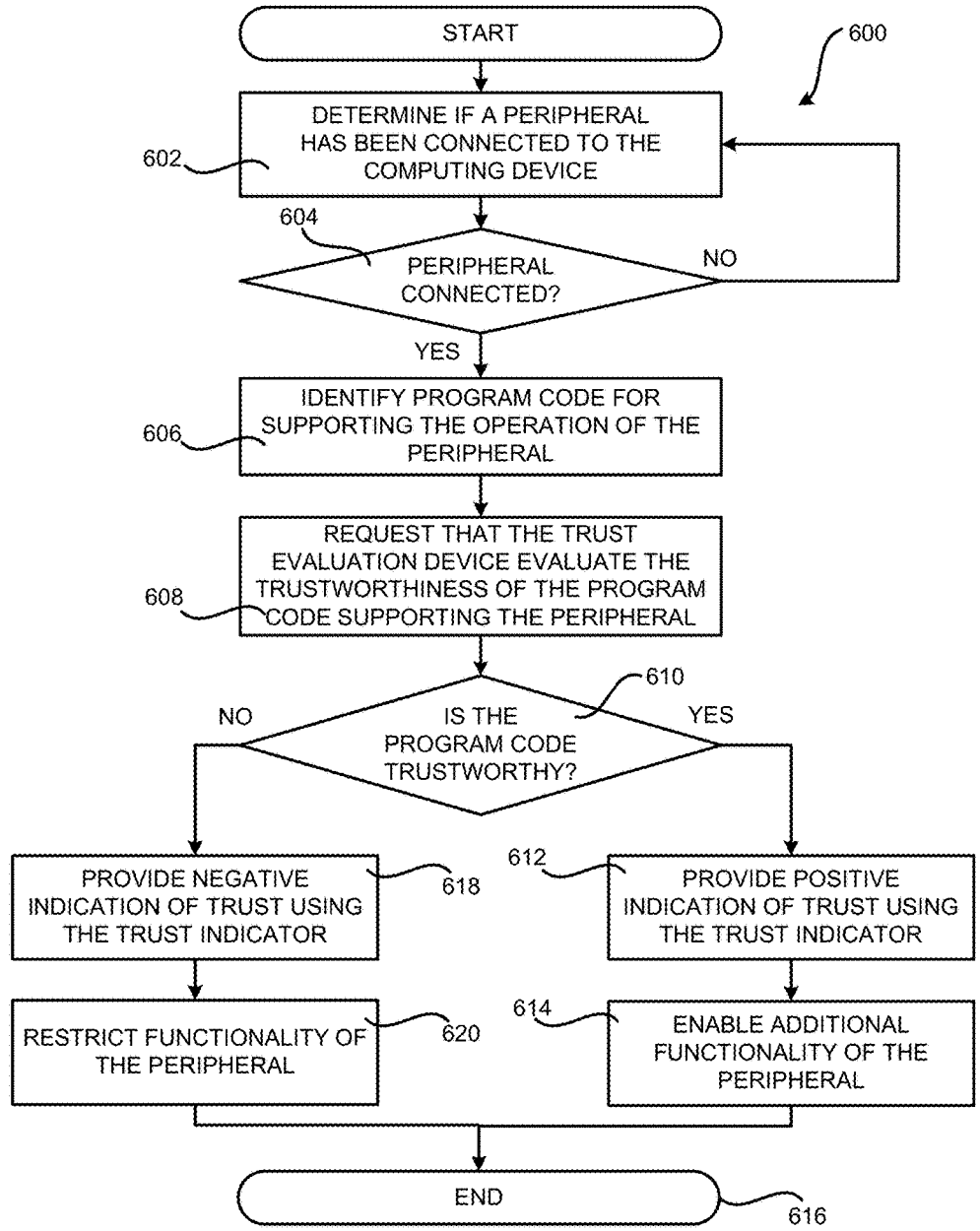
FIG. 6 is a flow diagram showing aspects of one illustrative routine for providing a trustworthy indication of the integrity of program code for supporting the operation of a peripheral device, such as a device driver, according to one embodiment disclosed herein.

As mentioned briefly above, the embodiments disclosed herein might also be utilized to provide a secure indication of the trustworthiness of computer programs other than application programs. For instance, the embodiments disclosed herein might provide an indication of the trustworthiness of driver programs and other low level software, such as a device driver for a peripheral device executing on the computing device 200. FIG. 6 is a flow diagram showing aspects of one illustrative routine 600 for providing a trustworthy indication of the integrity of a device driver for supporting the operation of a peripheral device according to one embodiment disclosed herein.

The routine 600 begins at operation 602, where the operating system 206 determines whether a peripheral has been connected to the computing device 200. If a peripheral has not been connected, the routine 600 proceeds from operation 604 back to operation 602, where another such determination is made. If, however, a peripheral has been connected to the computing device 200, the routine 600 proceeds from operation 604 to operation 606.

At operation 606, the operating system 206 identifies one or more device drivers for supporting the operation of the connected peripheral. The routine 600 then proceeds to operation 608, where the operating system 206 requests that the hardware trust evaluation device 210 evaluate the integrity of the identified device driver, or drivers. In response thereto, the hardware trust evaluation device 210 evaluates the trustworthiness of the device driver, or drivers, for supporting the operation of the peripheral in the manner described above.

If, at operation 610, the hardware trust evaluation device 210 determines that a device driver is trustworthy, the routine 600 proceeds from operation 610 to operation 612. At operation 612, the hardware trust evaluation device 210 provides a positive indication of the trustworthiness of the device driver using the trust indicator 212. For example, the hardware trust evaluation device 210 might cause an LED trust indicator 212 to blink in the color green for a preset period of time (e.g. 5 seconds). Other types of positive indications of trust might also be provided.

From operation 612, the routine 600 proceeds to operation 612, where additional functionality of the peripheral might be enabled in response to determining that the device driver is trustworthy. Other types of actions might also be performed in response to determining that the device driver for the peripheral is trustworthy.

If, at operation 610, the hardware trust evaluation device 210 determines that the device driver is not trustworthy, the routine 600 proceeds from operation 610 to operation 618. At operation 618, the hardware trust evaluation device 210 provides a negative indication of the trustworthiness of the device driver using the trust indicator 212. For example, the hardware trust evaluation device 210 might cause an LED trust indicator 212 to blink in the color red for a certain period of time. When a device driver is determined to be trustworthy or untrustworthy, a different type of indication may be provided than when an application program is deemed to be trustworthy or untrustworthy. In this manner, a user of the computing device 200 can discern the type of program that has been evaluated for trustworthiness.

From operation 618, the routine 600 proceeds to operation 620, where the computing device 200 might also restrict functionality of the peripheral and/or the computing device 200 in response to determining that the device driver is not trustworthy. For example, the computing device 200 might disable or restrict access to hardware components of the computing device 200, restrict access to APIs on the computing device 200, remove data from the computing device 200, terminate the execution of the device driver to disable operation of the peripheral, or entirely disable the computing device 200 in response to determining that the device driver is not trustworthy. Other types of functionality might also be restricted in response to identifying a device driver that is not trustworthy. From operations 614 and 620, the routine 600 proceeds to operation 616, where it ends.

It should be appreciated that, in various embodiments, one or more of operations 612, 614, 618, and 620 might be omitted. For instance, a negative indication of trust might be provided at operation 618, but operation 620 might be omitted. In a similar fashion, functionality might be restricted at operation 620 without providing a negative indication of trust at operation 618. As another example, a positive indication of trust might be provided at operation 612, but operation 614 might be omitted. Similarly, additional functionality might be provided at operation 614 without providing a positive indication of trust at operation 612.

In some other embodiments, a user or administrator of the computing device 200 might be permitted to define the manner in which the integrity of computer programs is evaluated and the manner in which the results of the evaluations are communicated to the user. For example, a user or administrator might define a policy such that the trust indicator 212 might provide a positive indication of trust if an application program does not call certain APIs even if the program is unsigned. If the program does call certain security sensitive APIs, then the trust indicator 212 may provide a negative indication of trust if the program is unsigned. In this way, programs that perform certain low-level operations that are not deemed to be security risks may be permitted to execute even though their trustworthiness cannot be readily ascertained. In other embodiments, a policy may be defined that requires the trust indicator 212 to provide a negative indication of trust if an application uses certain sensitive APIs, even if the application is deemed trustworthy.

According to other implementations, a user interface might be provided on the computing device 200 through which a user can select a program installed on the device and request that the trustworthiness of the selected program be evaluated. The results of the evaluation may be presented by way of the trust indicator 212 in the manner described above. In this way, the trustworthiness of programs can be evaluated in response to user input and at a time other than the run time of the programs.

Figure 7:
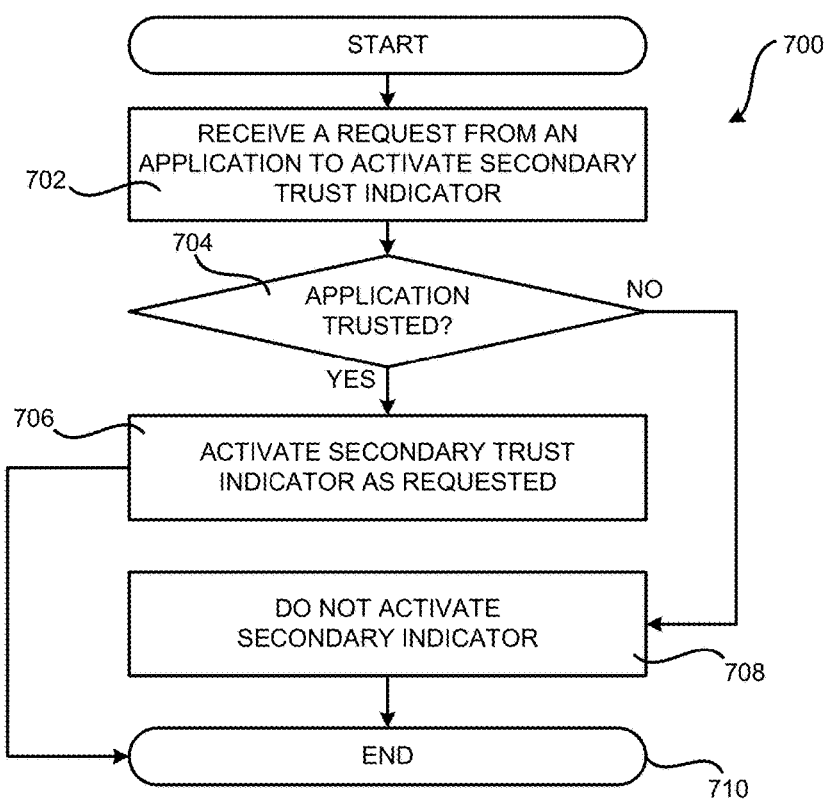
FIG. 7 is a flow diagram showing aspects of one illustrative routine for activating a secondary trust indicator, according to one embodiment disclosed herein.

FIG. 7 is a flow diagram showing aspects of one illustrative routine 700 for activating a secondary trust indicator 213, according to one embodiment disclosed herein. As discussed above with regard to FIG. 4B, a device 200 might be equipped with a secondary trust indicator 213 in some implementations. In these implementations, an application 208, operating system 206, or other type of program might be permitted to activate and/or otherwise utilize the secondary trust indicator 213 if the application 208, operating system 206, or other type of program has been deemed to be trustworthy. FIG. 7 shows one illustrative routine 700 for activating a secondary trust indicator 213 in this manner.

The routine 700 begins at operation 702, where the hardware trust evaluation device 210 receives a request from an application 208, operating system 206, or other type of program to activate a secondary trust indicator 213. In response to receiving such a request, the routine 700 proceeds to operation 704, where the hardware trust evaluation device 210 determines whether the program making the request has been previously verified as trustworthy.

If the program requesting to utilize the secondary trust indicator 213 has not been previously verified as trustworthy, the routine 700 proceeds from operation 704 to operation 708 where the request to utilize the secondary trust indicator 213 is denied. In an alternate embodiment, a determination of the trustworthiness of the program might be performed in the manner described above. If the program is deemed to be trustworthy, the program will be permitted to utilize the secondary trust indicator 213. If the program is not deemed to be trustworthy, the request will be denied at operation 708.

If, at operation 704, the hardware trust evaluation device 210 determines that the program requesting access to the secondary trust indicator 213 has been determined to be trustworthy, the routine 700 proceeds from operation 704 to operation 706. At operation 706, the hardware trust evaluation device 210 activates the secondary trust indicator 213 in the manner requested by the program. For instance, and as described above, the secondary trust indicator 213 might be activated in order to provide an indication of the trustworthiness of elements, activities, and/or data within or under the control of the trusted program making the request to utilize the secondary trust indicator 213. From operations 706 and 708, the routine 700 proceeds to operation 710, where it ends.

Figure 8:
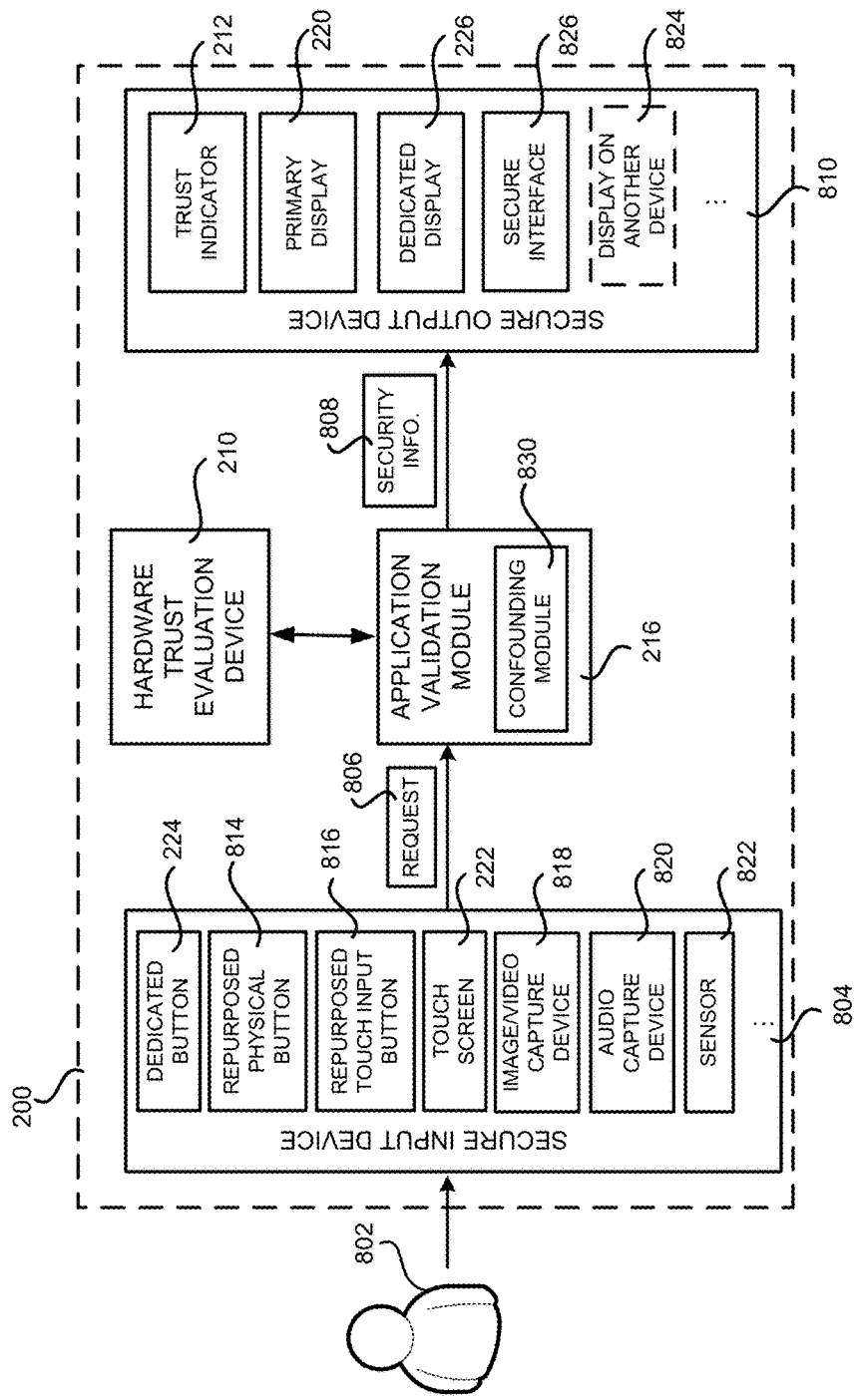
FIG. 8 is a block diagram showing aspects of one mechanism disclosed herein for displaying security information for an application program on a computing device, according to some aspects disclosed herein.

In addition to the indication of trustworthiness of the application program provided by the trust indicator 212, it might be beneficial to display additional security information to the user of the computing device 200. FIG. 8 is a block diagram showing aspects of one mechanism disclosed herein for displaying security information for an application program on a computing device 200. As discussed above, one of the potential problems with displaying security information on a primary display 220 of a computing device 200 is that a malicious application program might be able to display spoofed security information on the display screen that is the same as or similar to the authentic security information in an attempt to mislead the user or even induce the user to perform malicious operations on the computing device 200.

To minimize or eliminate such a problem, a secure mechanism for triggering the display of the security information is disclosed herein. Using an implementation of this mechanism, a request for the security information initiated by a user of the computing device 200 is not observable to the application programs 208. In this way, malicious application programs cannot observe when the security information has been requested or know when to display the security information.

In addition, the computing device 200 might be further configured to display the security information for a program only when the user explicitly requests the security information using the secure mechanism. In other words, if the security information is displayed without a request from the user via the secure mechanism, the user would immediately recognize and be alerted that the displayed security information is spoofed information. Accordingly, even if a malicious application program is capable of imitating the display of the security information, because the application program cannot detect when the security information is requested, the user would be fully alerted when the spoofed security information is displayed.

As illustrated in FIG. 8, a user 802 of the computing device 200 may send a request 806 for the security information for an application program 208 executing on the computing device 200 through one or more secure mechanisms offered by a secure input device 804. As will be disclosed in detail below, the secure input device 804 might be a dedicated button 224, one or more repurposed physical buttons 814, one or more repurposed touch input buttons 816, or a touch screen 222. In some implementations, the secure input device 804 might be an image/video capture device 818, such as a camera, an audio capture device 820, such as a microphone, or one or more sensors 822. The sensors 822 may include, but are not limited to, a fingerprint sensor, a temperature sensor, an elevation sensor, an accelerometer or other sensors that can detect an input by the user 802. For example, the user 802 may send the request 806 by enabling the image/video capture device 818 to capture a certain gesture of the user 802, or by the user 802 recording an audio signal using the audio capture device 820. Similarly, the request 806 may be sent by the user 802 activating a sensor 822, such as providing his/her fingerprint, moving the computing device 200 in a certain way and/or through other activities that can be captured by the sensor 822. It should be understood that the computing device 200 might be equipped with one of the above mechanisms as the secure input device 804. Alternatively, or additionally, the computing device 200 might employ a combination of two or more mechanisms discussed above to allow the user 802 to send the request 806.

Depending on the configuration of the computing device 200, the request 806 might be received by the operating system 206 and then forwarded to the application validation module 216 or be received directly by the application validation module 216. To ensure that the request 806 is not observable or otherwise accessible to an application program 208 executing on the computing device 200, the communication channel used to communicate the request 806 from the secure input device 804 to the application validation module 216 should be resistant to security threats that might be initiated by the application program 208. To achieve this goal, the processor executing the application programs 208 and the operating system 206 might be configured to be separated from the circuitry that connects the secure input device 804 to the application validation module 216 so that the processor does not have access to the request 806. For instance, in the configuration shown in FIG. 2, the secure input device 804 might be directly integrated with the application validation module 216. Alternatively, the secure input device 804 might be connected directly to the application validation module 216 through one or more wires, traces or other types of conductors, so that application programs 208 cannot intercept or observe the request 806.

The separation of the circuitry from the processor may be physical, electrical, and/or communicative. To effect this separation, the electrical traces of the circuitry may be physically separated from components accessible by the processor by a certain distance to avoid the possibility of an input generated by secure input device 804 being read by the processor. The distance may be determined as a function of the electrical signals used between the circuitry that connects the secure input device 804 to the application validation module 216. That is, the distance between adjacent traces and components may be selected such that any electrical signals generated by the secure input device 804 and/or the application validation module 216 are not able to induce electrical signals in the processor, its memory, or related components such that the processor and the memory can process the induced signals to derive an indication that one or more of the secure input device 804 have been activated.

In some cases, the circuitry that connects the secure input device 804 to the application validation module 216 may be electromagnetically isolated from the processor by a sufficient air gap or an electromagnetic shield configured to block stray emissions. In one embodiment, active circuitry may be used to cancel out any radiated electromagnetic fields, for example, by generating electromagnetic interference that generates sufficient noise to effectively obfuscate any electromagnetic fields generated by the secure input device 804 and/or the application validation module 216. Alternatively, such active circuitry may be tuned to specifically cancel any waves transmitted by the secure input device 804 and/or the application validation module 216. Additional electromagnetic interference shielding may be provided around the processor, its memory, the secure input device 804, and/or the application validation module 216 to compensate for the noise generated in the computing device 200.

In addition, different types of media may be utilized to interconnect the processor and its memory as opposed to using the circuitry that connects the secure input device 804 to the application validation module 216. For example, electrical traces may be used for the processor and its memory, while short range optical signals may be used for the circuitry that connects the secure input device 804 to the application validation module 216. An optical signal may be generated by the secure input device 804 and may be routed to the application validation module 216 and/or the hardware trust evaluation device 210 via a waveguide. Moreover, different communications protocols may be utilized for the processor and its memory as opposed to the circuitry that connects the secure input device 804 to the application validation module 216, for example, using the Inter-Integrated Circuit ($I^2C$) protocol versus the UNI/O protocol or the 1-wire protocol. In one embodiment, the secure input device 804 and the application validation module 216 may be configured to periodically change their communication protocol.

Additional security can be achieved by including a confounding module 830 in the application validation module 216. In scenarios where the user 802 submits a request 806 by pressing a button, such as the dedicated button 224, the button press might cause a power draw from the battery of the computing device 200. An application program 208 might be able to infer that the request 806 is being submitted by calling an API to detect signals such as a current draw from the battery, a voltage change at battery terminals or other places, a current change at terminals or other places, a temperature change at the battery, terminals, or traces, and so on. Likewise, the press of the button might also cause a movement of the computing device 200, which may be detectable to an application program 208 through calling an API to request movement data from a movement-detecting device, such as an accelerometer, a gyroscope, and the like. The application program 208 might be able to infer the submission of the request 806 in a similar way if the request 806 is submitted using other types of secure input device 804.

To prevent an application program 208 from inferring the request 806 through sensors accessible to the application program 208, the confounding module 830 might periodically and/or randomly add noise to the data detected by the sensors. For example, the confounding module 830 might cause a "dummy" power draw from the battery every two seconds so that the application program 208 cannot distinguish those dummy current draws from the actual current draw caused by the activation of the secure input device 804. Similarly, the confounding module 830 might also cause random movement data to be sent to the accelerometer API so that when the application program 208 request the movement data, the movement caused by the operation of the secure input device 804 is not distinguishable from the random movement data. Alternatively, or additionally, upon detecting that a request 806 is being submitted, the application validation module 216 might cause various sensors that are related to the activation of the secure input device 804 to be turned off to prevent the application program 208 from detecting activities triggered by the activation of the secure input device 804. For example, the application validation module 216 may be configured to prevent the secure input device 804 from being read by the application programs 208 or the processor executing the application programs 208, through the use of latch circuits and the like, which could involve selectively providing or removing power from the secure input device 804 and/or selectively connecting or disconnecting a communication path.

Once the application validation module 216 receives the request 806, the application validation module 216 might then identify the application program associated with the request 806 and request the hardware trust evaluation device 210 to evaluate the trustworthiness of the requested program. Additional details regarding the identification of the application program will be disclosed below in regard to FIG. 11. Based on the results of the evaluation performed by the hardware trust evaluation device 210, the application validation module 216 might generate security information 808 and send it to a secure output device 810 for display. The secure output device 810 might be the primary display 220, which might include a multi-layer display as discussed in detail below with regard to FIG. 11, or a dedicated display 226.

In some implementations, the security information 808 may be sent to another computing device through a secure communication channel to allow the security information 808 to be presented on the other computing device, such as on a display 824 (a dashed line is utilized in FIG. 8 to indicate that the display 824 is on a computing device different form the computing device 200). For example, in scenarios where the user 802 is being assisted by a customer service agent regarding the computing device 200, the user 802 may request the evaluation and the generation of the security information 808 for an application program 208 executing on the computing device 200. Rather than, or in addition to, being presented on the display 220 of the computing device 200, the security information 808 may be sent to a device associated with the customer service agent to facilitate the assistance to the user 802. To ensure the secure delivery of the security information 808 to the other computing device, the secure output device 810 might further include a secure interface component 824 for conveying the security information 808, which might include, but is not limited to, a dedicated wireless device, a nano transmitter, a standard computer interface, and/or other component that can be used to transmit information to another device.

It should be appreciated that while FIG. 8 primarily discloses presenting the security information on a display, the security information may be presented using various other output devices. For example, the secure output device might be a speaker, a buzzer, or other types of devices through which a signal representing the security information 808 of the application program can be provided to a user of the computing device 200. In addition, the trust indicator 212 may also be employed as a secure output device 810 to further indicate the trustworthiness of the requested application program. Additional details regarding these and other aspects of providing security information 808 of an application program will be disclosed below in regard to FIGS. 9-12.

Figure 9:
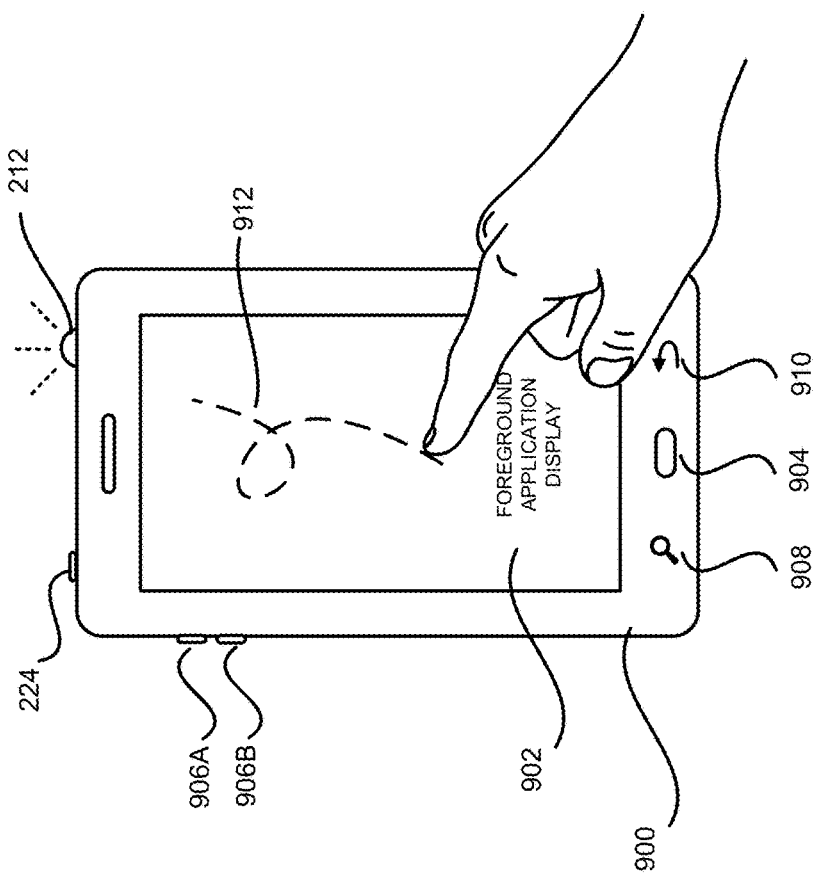
FIG. 9 is a device diagram showing aspects of the utilization of a mobile device that implements at least some of the functionality disclosed herein for providing security information for an application program.
Figure 10:
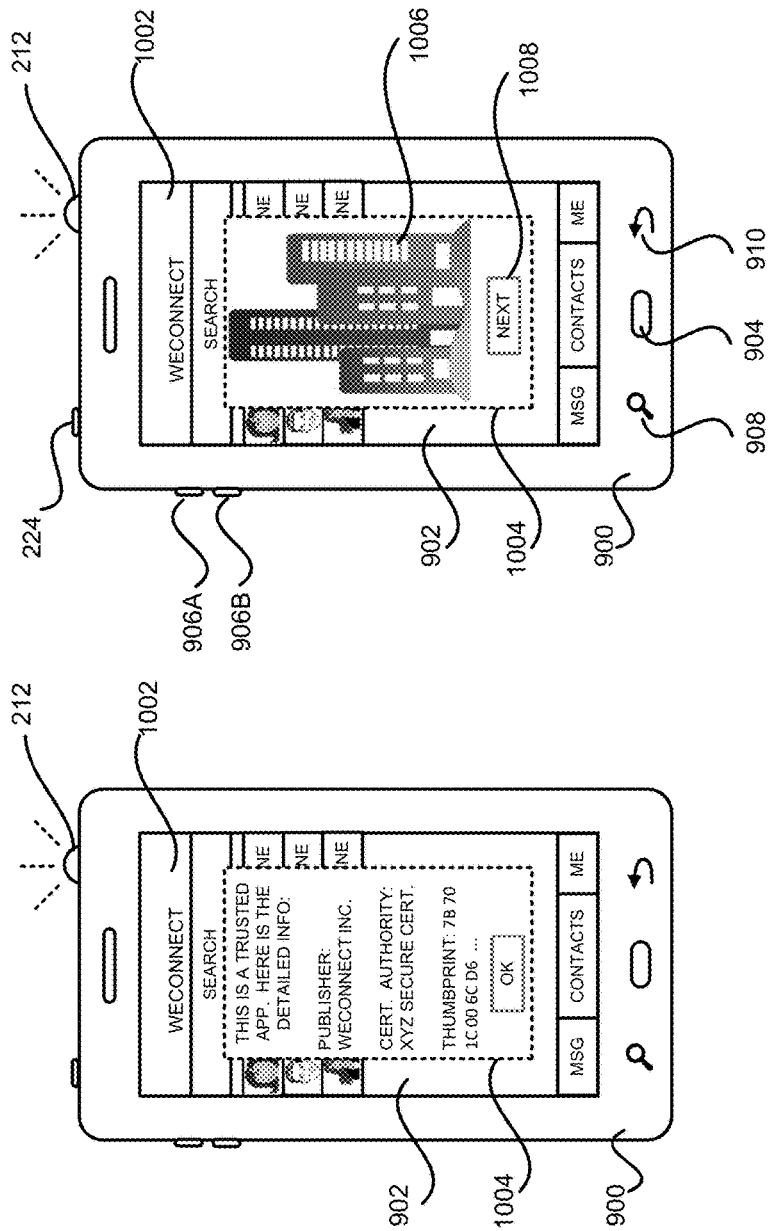
FIGS. 10A-10B are pictorial diagrams showing two illustrative user interfaces provided in some implementations disclosed herein for providing security information for an application program on a mobile device.

FIG. 9 is a device diagram showing aspects of the utilization of a smartphone computing device 900 that implements at least some of the functionality disclosed herein for displaying the security information for an application program on a display of the smartphone computing device 900. FIG. 9 illustrates several examples of the secure input device 804 that may be implemented on a smartphone computing device 900. As shown in FIG. 9, the smartphone computing device 900 includes a display screen 902 showing a foreground application, and physical buttons including a volume-up button 906A a volume-down button 906B for adjusting the volume of the speaker of the smartphone computing device 900, and a home button 904 for displaying a home screen on the display screen 902. The smartphone computing device 900 also includes touch input buttons, such as the search button 908 for displaying a search interface on the display 902 and the back button 910 for returning the content of the display screen 902 to a previous screen.

Considering that inputs generated by the physical buttons and the touch input buttons are generally handled by the operating system 206 and that the application programs 208 do not have direct access to these inputs, the generation of the request 806 may be achieved by repurposing (i.e. using the buttons for another purpose than that which they are primarily intended) the existing physical or touch input buttons 904~910 on the smartphone computing device 900. The user 802 of the smartphone computing device 900 may request to view the security information for an executing program by operating one or more of the buttons 904~910 in a way that is distinct from the normal manner of operation to indicate that the input generated from the buttons is a request 806 for the security information 808. For example, the request 806 may be generated by the user 802 through triple clicking on the volume-up button 906A whose normal operation is a single press for increasing the volume of the speaker. The request 806 might also be generated via the user 802 pressing multiple buttons, such as both the volume-up button 906A and the volume-down button 906B, at the same time or by pressing a set of buttons sequentially, for example, the back button 910 followed by the home button 904. It should be understood that examples presented above are for illustration only and should not be construed as limiting. Various other ways of repurposing the existing buttons of the smartphone computing device 900 may also be employed. It should be noted that in any event, the entry of the activation sequence must be observable only by the operating system 206 or the application validation module 216 and inaccessible to any of the application programs 208. Once the operating system 206 receives the request 806, it might forward it to the application validation module 216 for processing.

Typically, the display screen 902 might also include a touch screen. FIG. 9 further illustrates using the touch screen 902 to securely request the display of the security information for the foreground application. Normally, the touch screen 902 cannot be utilized for requesting the security information because user operations on the touch screen 902 are observable by a foreground application, which would present a trivial opportunity for a malicious application program to present spoofed security information. In some implementations of the smartphone computing device 900, however, the application programs 208 do not handle the input from the touch screen 902 directly. Rather a centralized driver or other secure component maintained by the operating system 206 intercepts the input received from the touch screen 902 and forwards the input to the corresponding application program 208. In such implementations, the touch screen 902 may be utilized to allow a user to draw a special pattern 912, or gesture, on the touch screen 902. The centralized driver or other component might intercept the special pattern 912 and recognize that this is a request 806 for security information 808 for the foreground application and forward the request to the application validation module 216 for further processing without passing the request on to any of the application programs 208.

Utilizing the existing buttons 904-910 or the touch screen 902 to generate the request for security information as described above requires the operating system 206 to be trusted to a certain degree. Specifically, the operating system 206 should be trusted that it will not forward, or otherwise make observable, the input generated using the repurposed buttons 904-910 and/or the touch screen 902 to any of the application programs 208. In scenarios where the integrity of the operating system 206 cannot be trusted, a dedicated button 224 that is integrated with or connected directly to the hardware trust evaluation device 210 may be employed to ensure the secure generation of the request 806 for the security information.

In some implementations, the dedicated button 224 might be configured to generate an input for requesting the display of the security information for the foreground application. A user of the smartphone computing device 900 may press the dedicated physical button 224, and the input generated by the press might be received directly by the application validation module 216. The application validation module 216 might recognize that the input is a request 806 for displaying the security information for the foreground application and request that the hardware trust evaluation device 210 perform a trustworthiness evaluation for the foreground application. Based on the results of the evaluation, the application validation module 216 might then generate the security information and cause it to be presented on the display screen 902. Additional details regarding the generation and display of the security information will be provided below with regard to FIGS. 10A and 10B. As illustrated in FIG. 9, the smartphone computing device 900 might also include a trust indicator 212. In addition to displaying the security information 808 on the display screen 902, the trust indicator 212 may be utilized to indicate the trustworthiness of the application program in the manner described above.

By using the dedicated button 224, the repurposed existing buttons 814, or the touch screen 222 of a computing device 200 as described above, the user input generated through the buttons are received by the operating system 206 or the application validation module 216, thereby preventing application programs 208 from accessing or observing the user's input. In such a way, any application program 208 executing on the computing device 200 would not detect the user's request 806 and, thereby, the possibility of a malicious program presenting spoofed security information on the display when a request 806 is submitted is minimized. It should be appreciated that the secure triggering mechanisms presented in FIG. 9 are for illustration only and should not be construed as limiting. Other types of triggering mechanisms might also be utilized in other implementations to allow a user 802 to send a request 806 that is unobservable to the application programs 208 executing on a computing device 200.

FIG. 10A shows an illustrative user interface provided in one implementation of the technologies disclosed herein for providing security information for an application program on a smartphone computing device 900. As illustrated in FIG. 10A, a security information user interface 1004 is displayed on the display screen 902. The security information user interface 1004 is displayed in response to a user 802 of the smartphone computing device 900 requesting the security information for a foreground application 1002 through the selection of one of the secure input devices 804 described above with regard to FIG. 9.

The security information user interface 1004 may be a full-screen, an overlay, a pop-up user interface, or another type of user interface. As illustrated in FIG. 10A, the security information user interface 1004 presents the security information 808 for the requested foreground application 1002, which might include a message indicating the trustworthiness of the requested application 1002, the name of the publisher or developer of the requested application 1002, the certifying authority or the thumbprint of the requested application 1002.

In other implementations, instead of or in addition to displaying the security information 808 itself, an interpretation of the security information 808 may be presented. For example, the security information user interface 1004 may show a message indicating that "Your application is safe," if it is determined that the application is trustworthy, or "your device is infected!" if it is determined that the application is not trustworthy. According to further aspects, when it is determined that the requested foreground application is not trustworthy, the security information user interface 1004 might further provide instructions for the user 802 to follow so that the program can be executed in a secure manner.

According to further aspects, the security information user interface 1004 might be designed to have a unique look that is different from the user interface typically utilized by application programs 208. For example, compared to the user interfaces of the application programs 208, the security information user interface 1004 might have a unique color scheme, a unique shape, a unique layout, and so on. When the security information user interface 1004 is presented, the user of the smartphone computing device 900 would be alerted that the security information 808 is being presented.

The unique visual presentation of the security information user interface 1004 may also allow the operating system 206 and/or the application validation module 216 to detect when spoofed security information is being displayed. For instance, the operating system 206 or the application validation module 216 might periodically obtain a screen capture of the contents of the display screen 902. The screen capture may then be compared with a baseline screen to determine whether the displayed screen is a security information user interface 1004. The baseline screen might include a template user interface having same basic elements, such as layout, color, shape and font size, as a security information user interface 1004. The baseline screen and the screen capture may be compared in terms of color, shape, and layout to determine whether they are similar. If it is determined that a user interface that is similar to a security information user interface 1004 is currently being displayed, and no request 806 has been received from the user 802 for the security information, the operating system 206 or the application validation module 216 may conclude that the displayed security information user interface 1004 is a spoofed display. In that case, the smartphone computing device 900 may display a warning message on the display 902, such as "This screen was not generated by the operating system. Don't trust it!" In addition, the smartphone computing device 900 might be configured to block the page, close the application, and/or report the malicious application to the administrator or other trusted entity on the user's behalf.

To further increase the security of the displaying process, a security image 1006 might be presented in the security information user interface 1004 before the security information 808 is presented as illustrated in FIG. 10B. The secure image 1006 might be an image that is pre-selected by the user 802 of the smartphone computing device 900 and only known to the user 802. For example, the secure image 1006 might be an image that the user 802 selects when he or she initially registers the smartphone computing device 900. If the user 802 recognizes the security image 1006, he or she may acknowledge it by selecting a user interface control 1008 shown on the display screen 902 or by pressing one or more of the buttons that are used when requesting the security information.

Upon receiving the acknowledgement, the smartphone computing device 900 might display the security information 808 of the requested program 1002 in the security information user interface 1004 as illustrated in FIG. 10A. If the user 802 does not recognize the security image 1006, the user 802 may conclude that the displayed security information user interface 1004 is a spoofed user interface, and the information displayed thereon should not be trusted. The user 802 may take further actions, such as close the foreground application 1002, uninstall the application 1002, and/or inform an administrator of the smartphone computing device 900 regarding the spoofed security information.

It should be appreciated that while FIGS. 9, 10A and 10B primarily disclose a smartphone computing device 900, the secure display of security information disclosed herein can be utilized on virtually any type of computing device 200 in a similar way. Therefore, the implementations described with regard to FIGS. 9, 10A and 10B should not be construed as being limited to a smartphone computing device 900.

Figure 11:
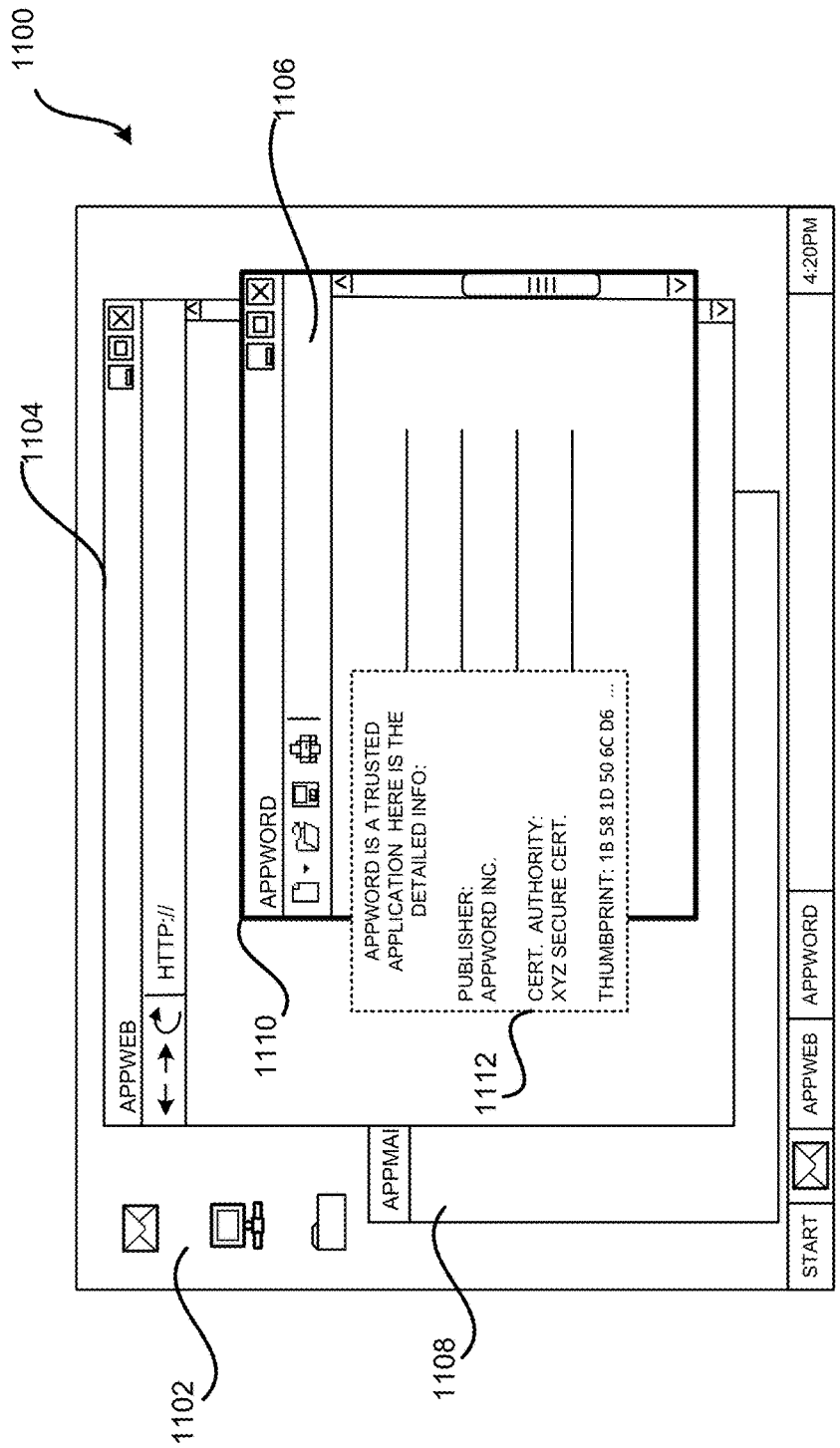
FIG. 11 is a pictorial diagram showing an illustrative user interface provided in a pre-emptive multitasking environment according to one aspect disclosed herein for providing security information for an application program.

FIG. 11 shows an illustrative user interface for displaying security information 808 for an application program in a pre-emptive multitasking environment 1100, such as the MICROSOFT WINDOWS operating system. Unlike the display screen 902 illustrated in FIGS. 9, 10A and 10B where the entire screen is allocated to only one application program, multiple application programs 1104, 1106 and 1108 share the display screen 1102 in the multitasking environment 1100 illustrated in FIG. 11. In such an environment, when a request 806 is received from a user 802 of the computing device 200 using one of the secure input devices 804 described above with regard to FIG. 9, it may not be clear as to which program is to be evaluated for trustworthiness. Further, when the security information 808 is displayed, there might be ambiguity to the user 802 as to which application program the displayed security information is for. As such, additional mechanisms may be necessary to allow the user to specify the requested program when submitting the request. Further, when the secure information 808 is being displayed on the screen 1102, the requested application program should be unambiguously and securely identified.

One way for a user 802 to specify a requested program in the multitasking environment 1100 is to assume that the program to be evaluated for trustworthiness is the program that is currently displaying the active window on the screen 1102 when the request 806 is submitted. The application validation module 216 may be configured to identify that, absent further input from the user 802, the program having the active window on the screen 1102 is the requested program. Alternatively, an explicit targeting mechanism may be utilized by the user 802 to specify the program for which trustworthiness is to be evaluated. For example, the user may enter a hotkey sequence followed by a mouse click on a user interface of the requested program. It should be understood that this example is for illustration only and should not be construed as limiting. Various other ways of explicit targeting may be employed. After receiving the request 806 and identifying the associated application, the application validation module 216 might cause the hardware trust evaluation device 210 to evaluate the trustworthiness of the application and generate the security information 808 for display.

To avoid the confusion caused by multiple windows displayed concurrently on the screen 1102, and also to prevent a malicious application from misleading the user regarding the displayed security information 808, the application program for which the security information 808 is displayed should be indicated in a secure way. This may be achieved through using a multi-layer display 220 in some configurations, which includes two or more independently controlled layers. One layer of the display 220 may be driven by the processor of the computing device 200 to display user interfaces of the application programs 208 and the operating system 206. Another layer of the display 220 may be driven directly by the hardware trust evaluation device 210 to display information obtained, generated or otherwise available to the hardware trust evaluation device 210. The display 220 might be connected to the processor of the computing device 200 and/or the hardware trust evaluation device 210 through a trusted video cable. Additional details about such a multi-layer display can be found in co-pending U.S. patent application Ser. No. 14/572,739, filed on Dec. 16, 2014, and entitled "Computing Device with Integrated Authentication Token," which is expressly incorporated herein by reference in its entirety.

When displaying the security information 808 using a multi-layer display 220, the program 1106, for which the security information is being displayed, may be highlighted by displaying, for example, a highlight box 1110 around the border of the application program 1106 on the display driven directly by the hardware trust evaluation device 210. Other methods may also be utilized to highlight the requested program 1106 on the display driven directly by the hardware trust evaluation device 210. In this way, the security information 808 may be displayed with a clear and secure indication of the associated application program, thereby minimizing or even eliminating the risk of the user 802 being misled by a malicious program.

Figure 12:
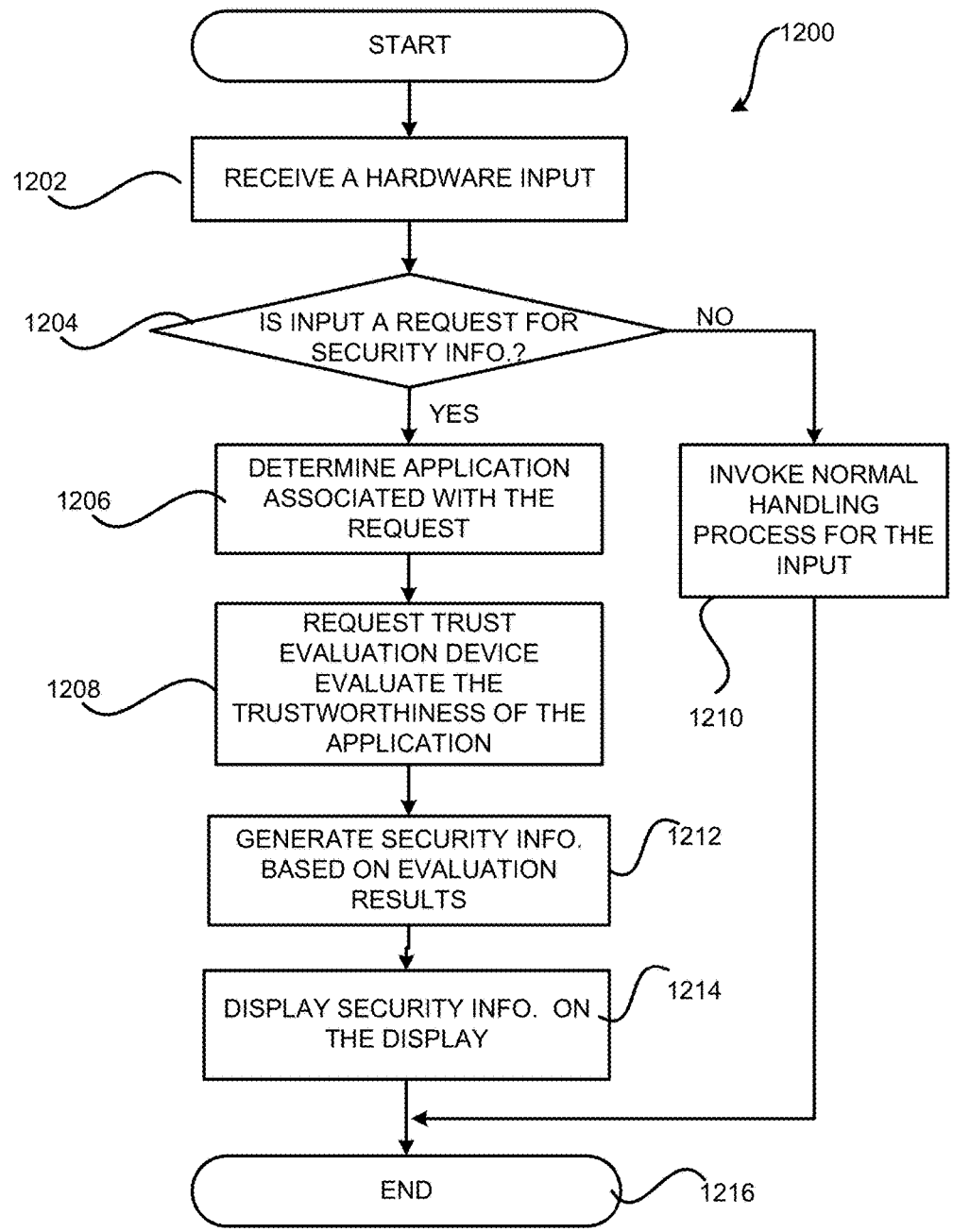
FIG. 12 is a flow diagram showing aspects of one illustrative routine for providing security information for an application program according to one aspect disclosed herein.

FIG. 12 is a flow diagram showing aspects of one illustrative routine 1200 for displaying security information 808 for an application program according to one aspect disclosed herein. In some implementations, the routine 1200 is performed by the operating system 206 and/or the application validation module 216 described above in regard to FIG. 2. The routine 1200 might be performed by another component in other configurations.

The routine 1200 begins at operation 1202, where the operating system 206 receives a hardware input. The routine 1200 then proceeds to operation 1204, where the operating system 206 determines if the hardware input is a special type of input that represents a request 806 for security information. As described above, a user of the computing device 200 may use existing buttons 814 and 816 to request security information 808 through a special sequence of operations that are different from the normal operation of the buttons. If the operating system 206 determines that the received input does not match the normal operation of these buttons, it may determine that the hardware input is a request 806 for security information and forward the request to the application validation module 216. The routine 1200 then proceeds to operation 1206.

If the hardware input is determined to be a normal operation of the hardware device, the routine 1200 proceeds to operation 1210 to have the hardware input processed in a regular manner. It should be noted that in scenarios where the computing device 200 has a dedicated button 224 connected directly to the hardware trust evaluation device 210, operation 1204 may be omitted because the application validation module 216 may receive the hardware input directly from the dedicated button 224 which is, by default, a request 806 for security information.

At operation 1206, the application program associated with the request is identified. As described above, in scenarios where the entirety of the display screen 220 is dedicated to only one application program, the requested program is determined to be the foreground application program, that is, the program executing on the device and currently displaying a user interface on the display 220. When there are multiple windows displayed on the display 220 as shown in FIG. 11, the requested application program may be identified as the program with the currently active window or be specified by the user 802 through explicit targeting as described above in regard to FIG. 11.

The routine 1200 then proceeds to operation 1208, where the hardware trust evaluation device 210 is employed to evaluate the trustworthiness of the requested application program. It should be noted that in some implementations, the application validation module 216 may first determine whether the requested program has been previously evaluated and whether the evaluation result is still up to date. For example, if the requested program has been previously evaluated and the code of the requested program has not changed since the last evaluation, the evaluation results may be considered as up to date. If so, the application validation module 216 may retrieve the evaluation results from a secure storage location, such as the memory of the hardware trust evaluation device 210.

The routine 1210 then proceeds to operation 1212, where various types of data may be generated, interpreted or gathered to generate the security information 808, and then to operation 1214 where the security information 808 is presented on the display 220 in a manner as described above with regard to FIGS. 10A, 10B and 11. From operation 1214, the routine 1200 proceeds to operation 1216, where it ends.

Figure 13:
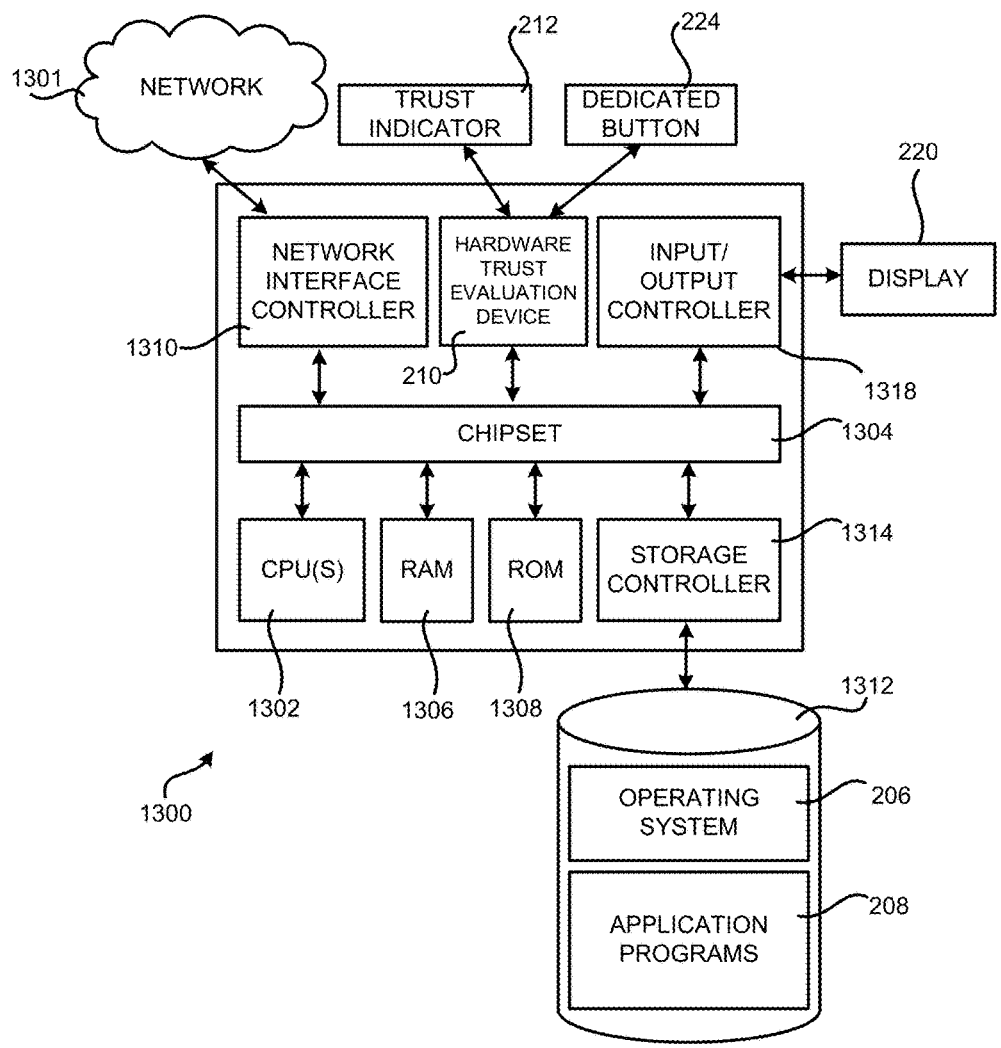
FIG. 13 is a computer architecture diagram showing one illustrative computer hardware architecture for use in computing devices configured to implement at least some of the concepts and technologies disclosed herein in one embodiment.

FIG. 13 shows an example computer architecture for a computing device 1300 capable of providing the functionality disclosed herein for trustworthy indication of software integrity. The computer architecture shown in FIG. 13 may be utilized to implement the various computing devices described above, such as a server computer, workstation, desktop computer, laptop, smartphone, personal digital assistant, e-book reader, digital wireless phone, tablet computer, network appliance, set-top box, or other computing device. The computer architecture shown in FIG. 13 might be utilized to implement other types of computing devices. Other types of architectures might also be utilized.

The computing device 1300 includes a baseboard, or "motherboard," which is a printed circuit board to which a multitude of components or devices may be connected by way of a system bus or other electrical communication paths. In one illustrative embodiment, one or more central processing units ("CPUs") 1302 operate in conjunction with a chipset 1304. The CPUs 1302 are standard programmable processors that perform arithmetic and logical operations necessary for the operation of the computer 1300.

The CPUs 1302 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 1304 provides an interface between the CPUs 1302 and the remainder of the components and devices on the baseboard. The chipset 1304 may provide an interface to a random access memory ("RAM") 1306, used as the main memory in the computer 1300. The chipset 1304 may further provide an interface to a computer-readable storage medium such as a read-only memory ("ROM") 1308 or non-volatile RAM ("NVRAM") for storing basic routines that that help to startup the computing device 1300 and to transfer information between the various components and devices. The ROM 1308 or NVRAM may also store other software components necessary for the operation of the computing device 1300 in accordance with the embodiments described herein.

According to various embodiments, the computing device 1300 may operate in a networked environment using logical connections to remote computing devices and computer systems through a network, such as a local-area network ("LAN"), a wide-area network ("WAN"), the Internet, or any other networking topology known in the art that connects the computing device 1300 to remote computers. The chipset 1304 includes functionality for providing network connectivity through a network interface controller ("NIC") 1310, such as a gigabit Ethernet adapter.

For example, the NIC 1310 may be capable of connecting the computing device 1300 to other computing devices over a network 1301, such as the Internet. It should be appreciated that multiple NICs 1310 may be present in the computing device 1300, connecting the computing device 1300 to other types of networks and remote computer systems.

The computing device 1300 may be connected to a mass storage device 1312 that provides non-volatile storage for the computer. The mass storage device 1312 may store system programs, application programs, other program modules, and data, which have been described in greater detail herein. The mass storage device 1312 may be connected to the computing device 1300 through a storage controller 1314 connected to the chipset 1304. The mass storage device 1312 may consist of one or more physical storage units. The storage controller 1314 may interface with the physical storage units through a serial attached SCSI ("SAS") interface, a serial advanced technology attachment ("SATA") interface, a FIBRE CHANNEL ("FC") interface, or other standard interface for physically connecting and transferring data between computers and physical storage devices.

The computing device 1300 may store data on the mass storage device 1312 by transforming the physical state of the physical storage units to reflect the information being stored. The specific transformation of physical state may depend on various factors in different implementations. Examples of such factors may include, but are not limited to, the technology used to implement the physical storage units, whether the mass storage device 1312 is characterized as primary or secondary storage, or the like.

For example, the computing device 1300 may store information to the mass storage device 1312 by issuing instructions through the storage controller 1314 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1300 may further read information from the mass storage device 1312 by detecting the physical states or characteristics of one or more particular locations within the physical storage units.

In addition to the mass storage device 1312 described above, the computing device 1300 might have access to other computer-readable media to store and retrieve information, such as program modules, data structures, or other data. It should be appreciated by those skilled in the art that computer-readable media can be any available media that may be accessed by the computing device 1300, including computer-readable storage media and communications media. Communications media includes transitory signals. Computer-readable storage media includes volatile and non-volatile, removable and non-removable storage media implemented in any method or technology. For example, computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information. Computer-readable storage media does not include transitory signals.

The mass storage device 1312 may store an operating system 206 utilized to control the operation of the computing device 1300. According to one embodiment, the operating system comprises the ANDROID operating system. According to another embodiment, the operating system comprises the iOS operating system from APPLE INC. According to further embodiments, the operating system may comprise the LINUX, UNIX, SOLARIS, or WINDOWS operating systems, from their respective manufacturers. It should be appreciated that other operating systems may also be utilized. The mass storage device 1312 may store other system or application programs and data utilized by the computing device 1300.

In one embodiment, the mass storage device 1312 or other computer-readable storage media may be encoded with computer-executable instructions that, when loaded into the computing device 1300, transform the computing device from a general-purpose computing system into a special-purpose computer capable of implementing the embodiments described herein. These computer-executable instructions transform the computing device 1300 by specifying how the CPUs 1302 transition between states, as described above. According to one embodiment, the computing device 1300 has access to computer-readable storage media storing computer-executable instructions that, when executed by the computer, perform the various routines and operations described herein.

The computing device 1300 may also include an input/output controller 1318 for receiving and processing input from a number of input devices, such as a keyboard, a mouse, a touchpad, a touch screen, an electronic stylus, or other type of input device. Similarly, the input/output controller 1318 may provide output to a display device, such as a computer monitor, a flat-panel display, a digital projector, a printer, a plotter, or other type of output device. It will be appreciated that the computing device 1300 may not include all of the components shown in FIG. 13, may include other components that are not explicitly shown in FIG. 13, or may utilize an architecture completely different than that shown in FIG. 13.

As illustrated in FIG. 13, the computing device 1300 might also be equipped with a hardware trust evaluation device 210. As also shown in FIG. 13 and described above, a trust indicator 212 may also be connected to or integrated with the hardware trust evaluation device 210. Through the use of these devices, the computing device 1300 can provide a trustworthy indication of software integrity in the manner described above.

Based on the foregoing, it should be appreciated that technologies for providing a trustworthy indication of software integrity have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for providing security information for a computer program, comprising:
   identifying an application associated with a request from a user using the application for security information based at least in part on determining that the application is presenting an application user interface on a display during the use by the user;
   requesting, based at least in part on the request for the security information, a trust evaluation device to evaluate trustworthiness of the application;
   generating, based at least in part on an evaluation of the trustworthiness of the application, the security information; and
   displaying a security information user interface separate from the application user interface, the security information user interface including the security information.

2. The computer-implemented method of claim 1, further comprising:
   generating the request for security information based at least in part on a detected actuation of a hardware button for requesting security information.

3. The computer-implemented method of claim 1, further comprising:
   generating the request for security information based at least in part on a detected pre-defined gesture being made on a touch screen.

4. The computer-implemented method of claim 1, further comprising:
   displaying, on the security information user interface, a security image pre-selected by a user.

5. The computer-implemented method of claim 1, further comprising:
   determining, based at least in part on the security information, that the application is not trustworthy; and
   restricting functionality of the application.

6. The computer-implemented method of claim 1, further comprising:
   determining, based at least in part on the security information, that the application is trustworthy; and
   enabling additional functionality of the application.

7. The computer-implemented method of claim 1, further comprising:
   sending the security information to another computing device.

8. A non-transitory computer-readable storage medium having computer-executable instructions stored thereupon which, when executed by a computing device, cause the computing device to:

identify an application presenting an application user interface on a display for which security information requested by a user using the application is to be determined based at least in part on determining that the application is presenting the application user interface on the display during the use by the user;

cause a trust evaluation device to evaluate trustworthiness of the application;

generate, based at least in part on an evaluation of the trustworthiness of the application, the security information; and display a security information user interface separate from the application user interface, the security information user interface including the security information.

9. The non-transitory computer-readable storage medium of claim 8, wherein the computer-executable instructions, when executed by the computing device, cause the computing device to:

receive a request for security information of the application, wherein the received request is generated by a hardware input component configured to generate the request for security information.

10. The non-transitory computer-readable storage medium of claim 8, wherein the computer-executable instructions, when executed by the computing device, cause the computing device to:

determine, based at least in part on the security information, that the application is not trustworthy; and restrict functionality of the application.

11. The non-transitory computer-readable storage medium of claim 8, wherein the computer-executable instructions, when executed by the computing device, cause the computing device to:

determine, based at least in part on the security information, that the application is trustworthy; and enable additional functionality of the application.

12. The non-transitory computer-readable storage medium of claim 8, wherein the computer-executable instructions, when executed by the computing device, cause the computing device to:

display, on the security information user interface, a security image pre-selected by a user.

13. The non-transitory computer-readable storage medium of claim 8, wherein the computer-executable instructions, when executed by the computing device, cause the computing device to:

send the security information to another computing device.

14. A computing device configured to provide security information for an application executing on the computing device, the computing device comprising:

at least one processor configured to execute the application;

an output device; and a memory connected to the at least one processor storing instructions, when executed by the at least one processor, configure the at least one processor to:

identify an application presenting an application user interface on a display executing on the at least one processor for which security information requested by a user using the application is to be determined based at least in part on determining that the application is presenting the application user interface on the display during the use by the user;

cause a trust evaluation to evaluate trustworthiness of the application;

generate, based at least in part on the trustworthiness of the application, the security information; and display, on the output device, a security information user interface separate from the application user interface, the security information user interface including the security information.

15. The computing device of claim 14, further comprising:

a hardware input component configured to, when activated, generate a request for the security information for the application, wherein the instructions, when executed by the at least one processor, further configure the at least one processor to:

receive the request for the security information for the application via the hardware input component of the computing device, wherein the application executing on the at least one processor for which security information is to be determined is identified responsive to receiving the request.

16. The computing device of claim 15, wherein the hardware input component of the computing device comprises a touch screen, and wherein the request is generated in response to a pre-defined gesture being detected on the touch screen.

17. The computing device of claim 15, wherein the hardware input component of the computing device comprises a hardware button dedicated to generating a request for the security information for the computer program.

18. The computing device of claim 14, wherein the instructions, when executed by the at least one processor, further configure the at least one processor to:

determine, based at least in part on the security information, that the application is not trustworthy; and restrict functionality of the application.

19. The computing device of claim 14, wherein the instructions, when executed by the at least one processor, further configure the at least one processor to:

determine, based at least in part on the security information, that the application is trustworthy; and enable additional functionality of the application.

20. The computing device of claim 14, wherein the instructions, when executed by the at least one processor, further configure the at least one processor to:

send the security information to another computing device.

* * * * *